United States Patent
Shaw et al.

(10) Patent No.: US 6,516,341 B2
(45) Date of Patent: *Feb. 4, 2003

(54) ELECTRONIC MAIL SYSTEM WITH ADVERTISING

(75) Inventors: David E. Shaw, New York, NY (US); Charles E. Ardai, New York, NY (US); Brian D. Marsh, New York, NY (US); Mark A. Moraes, Forest Hills, NY (US); Dana B. Rudolph, West Hempstead, NY (US); Jon D. Mc Auliffe, New York, NY (US)

(73) Assignee: Juno Online Services, Inc.

( * ) Notice: Subject to any disclaimer, the term of this patent is extended or adjusted under 35 U.S.C. 154(b) by 44 days.

This patent is subject to a terminal disclaimer.

(21) Appl. No.: 09/768,273

(22) Filed: Jan. 25, 2001

(65) Prior Publication Data

US 2001/0005855 A1 Jun. 28, 2001

Related U.S. Application Data

(63) Continuation of application No. 09/153,145, filed on Sep. 14, 1998, now Pat. No. 6,199,106.

(51) Int. Cl.⁷ .............................................. G06F 13/00
(52) U.S. Cl. ...................................... 709/206; 709/217
(58) Field of Search ................................ 709/200, 201, 709/203, 217, 218, 219, 206, 221, 223, 224, 227

(56) References Cited

U.S. PATENT DOCUMENTS

| | | | | |
|---|---|---|---|---|
| 5,177,680 A | * | 1/1993 | Tsukino et al. | 704/1 |
| 5,265,033 A | * | 11/1993 | Vajk et al. | 709/206 |
| 5,276,869 A | * | 1/1994 | Forrest et al. | 709/206 |
| 5,283,731 A | * | 2/1994 | Lalonde et al. | 705/1 |
| 5,305,195 A | * | 4/1994 | Murphy | 705/1 |
| 5,319,455 A | * | 6/1994 | Hoarty et al. | 348/7 |
| 5,353,218 A | * | 10/1994 | De Lapa et al. | 705/114 |
| 5,361,393 A | * | 11/1994 | Rossillo | 395/651 |
| 5,404,505 A | * | 4/1995 | Levinson | 707/10 |
| 5,414,773 A | * | 5/1995 | Handelman | 348/6 |
| 5,426,427 A | * | 6/1995 | Chinnock et al. | 709/206 |
| 5,426,594 A | * | 6/1995 | Wright et al. | 709/206 |
| 5,428,606 A | * | 6/1995 | Moskowitz | 370/400 |
| 5,434,978 A | * | 7/1995 | Dockter et al. | 709/206 |
| 5,809,242 A | * | 9/1998 | Shaw et al. | 709/217 |

* cited by examiner

Primary Examiner—Moustafa M. Meky
(74) Attorney, Agent, or Firm—Steven C. Sereboff; SoCal IP Law Group

(57) ABSTRACT

A system for providing scheduled messages to a remote user in a batch oriented system. In a preferred embodiment of the present invention, a user creates and/or reads electronic mail locally. While the user creates the electronic mail, a message is displayed to the user on a portion of the local monitor, the message preferably changing in accordance with a local display schedule and stored on a local storage device. The message is preferably targeted to the particular user. When the user is ready to transmit the e-mail created and/or receive e-mail addressed to him, the user's local client establishes a connection via a modem with a remote e-mail server system. The remote e-mail server system not only receives the e-mail transmitted by the user and/or transmits e-mail addressed to the user, but also updates the user's local messages in accordance with a distribution schedule. After the e-mail and message updates are transmitted, the user's local client computer is disconnected from the remote e-mail server system.

34 Claims, 12 Drawing Sheets

Member Profile

15: What sorts of programs do you like to watch on TV?

| | Sometimes watch | Often watch | Watch daily |
|---|---|---|---|
| News | O | O — 703 | O |
| Daytime talk shows | O | O | O |
| Late night talk shows | O | O | O |
| Game shows | O | O | O |
| Educational | O | O | O |
| Cartoons | O | O | O |
| Feature films | O | O | O |
| Made-for-TV movies | O | O | O |
| Musical programming | O | O | O |
| Music videos | O | O | O |
| Sitcoms | O | O | O |
| Stand-up comedy | O | O | O |
| Soap operas | O | O | O |
| Sports | O | O | O |
| Political commentary | O | O | O |
| Financial programs | O | O | O |

☐ I never watch any of these types of programs

[<Back] — 705   [Next>] — 704   [Cancel]   [Help]

FIG. 7

ELECTRONIC MAIL SYSTEM WITH ADVERTISING

This application is a continuation of application Ser. No. 09/153,145, filed Sep. 14, 1998, now U.S. Pat. No. 6,199,106.

FIELD OF THE INVENTION

The present invention is directed to an electronic mail system that displays advertisements to remote users, and in particular, to a system that displays targeted advertisements to remote users when the users are off-line.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Electronic mail (or "e-mail") is becoming a popular way for people to communicate. Using e-mail, a person can send messages and other information (such as pictures, sound recordings, formatted documents, etc. that are in digital form) electronically to other e-mail users.

E-mail communication systems are generally regarded as multi-cast store-and-forward bi-directional communication systems. A user can send e-mail messages to one or more recipients at a time. An e-mail system is regarded as bi-directional as, usually, a user can both send and receive e-mail messages.

When using e-mail to communicate, a user will typically create a message using an e-mail program running on a computer that is or can be connected by a network to other computers. The message will include the e-mail address of the intended recipient. When the user has finished entering the message, the user will "send" the message to the intended recipient—the message is electronically transmitted via the computer network. The recipient, also using an e-mail program running on a computer connected to the computer network, can then read the received message.

A common computer network used to send and receive e-mail is the Internet. The Internet allows users to send and receive e-mail to and from computers around the world. Typically, each user will have an Internet e-mail address unique to that user, e.g., bob@pto.com. A user with an e-mail account and a computer that can connect to the Internet can easily send and receive e-mail over the Internet.

There are a number of ways that a user can connect to the Internet to send and receive e-mail. A user can have an account with a proprietary on-line network, such as, for example, Prodigy, America Online, CompuServe or Microsoft Network. Using a computer with a modem, the user dials up the on-line network's access number and connects to the on-line network. The user can then send and receive e-mail to and from other users of the on-line network and, provided that the on-line network is connected to the Internet, with those having an Internet e-mail address. An alternative method to connect with the Internet is via an Internet Service Provider. Using a modem, the user dials the access number of the Internet Service Provider, and establishes a connection with a computer "directly" connected to or part of the Internet. The user can then operate an e-mail program, such as Eudora, to send and receive e-mail over the Internet.

In many existing systems, users read and write e-mail while on-line, i.e., while connected to the on-line network or the Internet Service Provider. Costs of operating the on-line network (including communication and hardware costs) are higher when users are connected to the network. Also, some on-line networks and Internet Access Providers charge per minute of connect time. Accordingly, it is more cost effective if users read and write e-mail messages when off-line (e.g., when not connected to the on-line network).

Some existing on-line services display advertising to users. For example, advertisements are shown on part of the screen to users of the America Online network. When accessing certain World Wide Web sites on the Internet, advertisements are often included as part of the web page seen by the user. Often in such systems, each user accessing a certain screen or site is shown the same advertisement. Sophisticated systems have the capability to change the advertisement after a certain period of time. However, in such systems the user must remain connected to the network to see the replacement advertisement.

When using a browser program (such as Netscape's Navigator program) to access pages on the World Wide Web, information, which may include advertisements, may be downloaded and cached at a user's computer. This information can be flushed from the cache at a later time, as determined by the browser program. In some cases, this information may be flushed when the browser program is "off-line." However, advertisements are not automatically replaced in a web page and new, unseen advertisements are not displayed as part of a web page when in such disconnected mode.

Accordingly, there is a need for a system that displays and automatically replaces displayed advertisements while disconnected from the network.

In particular, there is a need for an e-mail system that operates mostly off-line and that can display and automatically replace displayed advertisements while off-line.

Advertisers find it desirable to target advertisements to relevant potential customers. For example, an advertiser of stockings would prefer to target women rather than men with its advertising. A Boston restaurant would prefer to target residents of Boston and business travelers rather than children living in San Francisco. Moreover, advertisers prefer to pay for advertising based upon the number of relevant consumers who are actually exposed to the advertisement. For prior on-line systems and networks, including the World Wide Web, it is often difficult for an advertiser to precisely determine whether its advertisements were actually viewed by a user and for how long, and whether the advertisement induced a response. Accordingly, there exists a need for a targeted advertisement system that also can provide information as to the characteristics of those who were exposed to each advertisement, for how long the user was exposed, and at what times.

Existing e-mail systems have other disadvantages. In existing dial-up e-mail systems, a user is provided with an access telephone number to connect to the network. Typically, at the network there are a number of mail servers and each user's received e-mail messages are stored on one of those mail servers. Because many users use the same access number to connect to the network, the network requires capabilities to switch users to the mail server that stores that user's e-mail. Existing e-mail networks determine at the server side and while the user is on-line who the user is and that user's mail server, and then switch the user to that mail server—a time consuming operation, especially if there are many users accessing the network. There exists a need for an e-mail system where the network does not have to decide, as part of the switching process, which mail server is to be accessed by each user.

SUMMARY OF THE INVENTION

The present invention is directed to a disconnected electronic mail system that displays targeted advertisements. More particularly, the present invention allows users to view advertisements while receiving, composing, and managing personal electronic communications.

In a representative embodiment of the present invention, a "mostly disconnected," highly scalable, client-server architecture is provided for the delivery of personal communications and advertisements. The representative embodiment provides higher performance than existing systems, and consequently lower costs per user.

The representative embodiment of the present invention is "mostly disconnected" because it batches up requests for on-demand transmission to the server. Accordingly, efficiency of connections is increased to nearly 100%, making it more economically viable than one that leaves the connection open.

In the representative embodiment of the present invention, a client computer is used by each user and runs a client program. The client computer may be, for example, a personal computer with an Intel Pentium or 486 processor and a Microsoft Windows or OS/2 operating system. The client computer has the capability to connect to a remote computer network, e.g., by modem. The client computer also has a secondary memory device, such as, for example, a hard disk drive. The client program of the present invention is stored on the hard disk drive and is executed by the client computer's processor.

The client program periodically communicates with a server system. In the representative embodiment, the server system comprises a number of mail servers and a database management system. Each mail server is a high speed processor with secondary memory. Each mail server is coupled to the database management system and to an external computer network, such as, for example, the Internet. Each of the mail servers executes a server program. The server system has communication facilities to allow client computers to connect with mail servers, so that client programs can communicate with server programs.

In the representative embodiment, the client computer is remotely located with respect to the server system. Typically, there are many users, each with a client computer executing the client program and capable of communicating simultaneously with the server system.

Although the terms "client" and "server" are used herein, the present invention is not a client/server local area network. Moreover, the architecture of the present invention is not limited to what is known in the art as a client/server network.

In the representative embodiment, a user can use the client program to read, write, edit, send, receive and store electronic mail ("e-mail"). The term e-mail when used herein includes messages that are transmitted over a communications network, computer to computer. E-mail messages include text messages, graphics, formatted documents and files, sound files, MPEG files and the like. It will be appreciated, however, that the principles of the present invention will apply to other types of computer based communications other than e-mail.

Sending E-Mail: Using the client program, the user composes one or more e-mail messages. The messages include the e-mail address of the intended recipient. The user composes the messages while off-line, i.e., when the user is composing a message, the client computer is not connected to the server system. While composing e-mail messages, advertisements are displayed to the user by the client program. The advertisements can be displayed in a separate window, e.g., in a small window at the top of the screen of the client computer. When finished composing e-mail messages, the user instructs the client program to send the e-mail messages to the intended recipients.

Accordingly, the client program causes the client computer to establish an electronic connection with the server system. In the representative embodiment, the client program causes the client computer's modem to establish a telephone link to the server system. The client program then transmits the outgoing e-mail messages to the server system. Once communications with the server system are complete, the client computer goes off-line by terminating the phone call. During the connection and transmission process, advertisements are displayed to the user by the client program.

The e-mail messages that were communicated to the server system are transmitted to the intended recipients, e.g., over the Internet or to the mailboxes of the intended recipients on the mail servers of the server system.

Receiving E-Mail: E-mail messages received by the server system, e.g., via the Internet or from other users of the server system, are stored for each user in a predetermined directory on a predetermined mail server. When a user wishes to check to see if the user has received e-mail messages, the user instructs the client program to retrieve such e-mail messages from the client system.

Accordingly, the client program causes the client computer to establish an electronic connection with the server system, as discussed above. The server system transmits the e-mail messages for that user to the client program. Once communications with the server system are complete, the client computer goes off-line. During the connection and transmission process, advertisements are displayed to the user by the client program.

Using the client program, the user can read the received e-mail messages. The user reads e-mail received while off-line, i.e., when the user is reading messages, the client computer is not connected to the server system. While reading e-mail messages, advertisements are displayed to the user by the client program.

It will be appreciated that e-mail can be sent and received during the same connection. That is, when the client computer establishes a connection with the server system, e-mail messages can be transferred both from the client computer to server system and from the server system to the client computer.

The communications between the client program and the server system may be regarded as a batch system, as e-mail messages are created and read off-line, and e-mail messages that are to be transferred are transferred as a batch when the client computer establishes a connection with the server system.

An e-mail system such as that of the representative embodiment of the present invention that connects only while transferring e-mail and advertising material has many advantages that have not been exploited by existing on-line services. One such advantage is that communication costs and hardware requirements are substantially lower than for "fully-connected" on-line service. Moreover, while the system of the present invention is designed to operate in a mostly disconnected mode, the present invention will replace displayed advertisements with other advertisements while disconnected.

Targeted Advertisements: When first using the system of the present invention, the user completes a member profile (or survey) at the client computer. The member profile records information about the user, e.g., hobbies, interests, employment, education, sports, demographics, etc. The client program transmits the member profile to the server system when the user's client program first establishes a connection with the server system (e.g., on initial sign-up). The member profile is stored in the database management system of the server system.

The server system utilizes the information in the member profile to determine which advertisements should be directed to the user. Accordingly, an advertisement distribution scheduler of the server system decides which advertisements are eligible for distribution for each user.

Whenever a user (i.e., the client program of the user) establishes a connection with the server system (e.g., to send and/or receive mail), eligible advertisements can be transmitted from the server system to the client program and stored on a memory device (e.g., a hard disk drive) of the client computer.

The "down-loaded" advertisements that are stored locally can then be displayed to the user when the user is off-line, for example, when composing and reading e-mail messages, and when in the process of establishing a connection with the server system. The advertisements can also be displayed when other communications are taking place between the client program and the server system.

Thus, unlike prior systems, the present invention stores advertisements at the user's client computer so that the advertisements can be displayed when the user is not on-line. The display can be changed at periodic intervals when the client program is in use, e.g., every thirty seconds a new advertisement can be displayed.

Unlike partially connected systems that request a connection immediately when new data is required (such as in a system utilizing a browser program to access World Wide Web pages), the present invention will delay all server requests until a connection is actually established by the user. The present invention has a local advertisement system that controls the output of advertisements when the client computer is disconnected. In sharp contrast, browser programs, such as Netscape's Navigator program, do not have locally controlled advertisement systems directed to the off-line display of advertisements.

It will be appreciated that the advertisements also may include community service messages, system information messages, colorful and pleasing artwork, photographic works, logos, slogans and the like. As used herein, the term advertisement includes any content other than or unrelated to e-mail messages or other such messages used in communications between users.

Additionally, the client program of the present invention allows the user to select a particular advertisement (e.g., by double clicking on the message using a computer mouse) to have displayed additional information relating to the advertisement. For example, a user may select a displayed advertisement for a motor vehicle and the client program will cause to be displayed a screen of additional information concerning the motor vehicle and the locations of approved dealers. This additional information is also stored locally on a storage device of the client computer, and can be displayed to the user when the client program is off-line and not connected to the server system.

Optionally, an advertisement displayed by the client program of the present invention may include a "more information" button. When the user selects the "more information" button, a predetermined message requesting further information is prepared and communicated to the server system when the client program next connects to the server system. At that or a later time, additional related information is sent by e-mail to the user who made the request.

In the representative embodiment, the user may wish to send an e-mail message to an advertiser. The advertisements displayed by client program of the present invention can include e-mail address information for the advertiser (or related persons, such as dealers, stores, customer assistance, etc.). If the user wishes to send an e-mail message to the advertiser, the user can select the e-mail address (or a predetermined button, e.g., an "e-mail to advertiser" button) and the client program will automatically format an appropriate e-mail message with the correct e-mail address and/or enable the user to easily compose an e-mail message to the advertiser.

The client program records (i) which advertisements are shown to the user, for how long and at what times; (ii) when there is a period of inactivity while the client program is running on the client computer, for example, if the user does not enter an instruction for a period of five minutes; and (iii) whether any advertisement has been altered by the user. This information is stored in an advertisement statistics file on the client computer and is communicated to the server system when the client computer establishes a connection with the server system to send and receive e-mail messages. The server system stores data from each advertisement statistics file in the database management system. The information in the advertisement statistics file can be used to create billing information to bill advertisers based on advertisements actually viewed.

Thus, unlike prior systems, the present invention can download to a client computer a number of advertisements (which may or may not actually be viewed by the user) and bill the advertisers only for those advertisements displayed to the user.

Moreover, an advertisement may be downloaded once but viewed many times by a user, thus reducing transmission costs. The advertiser can be billed for the multiple viewings of the advertisement. This is in sharp contrast to advertisements displayed on the World Wide Web, where a user may visit a web site many times but because of caching functions of most web browsers, the advertiser is unaware that the advertisement has been viewed more than once. Further, web advertisers at present have no way of determining for how long the advertisement was displayed to the user. Thus, the integrated targeted advertisement system of the present invention provides a number of advantages over web-based systems. According to the present invention, users willingly identify themselves and their consumer interests, and make user verification possible. Furthermore, the system of the present invention can provide extremely accurate data as to how long an advertisement was shown to a user, when it was clicked on, and how many times it was shown before the user responded to the advertisement.

The server system can utilize the information from the advertisement statistics file to direct follow-up e-mail messages "from advertisers" to users. For example, after an advertisement has been displayed to the user, the server system can send an e-mail message relating to the advertisement to that user.

According to the present invention, display of advertisements is determined by the client program. The client program includes a scheduler module that determines which advertisements to display to the user and for how long.

The client program also records (i) when a user activates the client program; (ii) how long the client program was used; (iii) modem configuration problems; (iv) information as to how well the client program functioned; (v) any communication problems with the server system; and (vi) other statistical information useful to predict a user's future behavior with respect to the client program. This information is stored in an event log file on the client computer and is communicated to the server system when the user sends and/or receives e-mail messages or whenever the client computer establishes a connection with the server system. The server system stores data from each event log file in the database management system.

As discussed above, the advertisement distribution scheduler of the server system determines which advertisements are eligible for distribution to each user. The advertisement distribution system can utilize the information in the event log file and/or advertisement statistics file in making the determination as to which advertisements are eligible for distribution to a particular user.

The server system also includes a download scheduler module that determines when to download (i.e., transfer) a particular advertisement to a user. The client scheduler module, the advertisement distribution scheduler and the download scheduler module are disclosed in co-pending patent application entitled "Method and Apparatus For Scheduling the Presentation of Messages to Computer Users," in the names of Brian D. Marsh and Jon D. Mc Auliffe, Ser. No. 08/636,745, filed concurrently herewith, and expressly incorporated herein by reference, now U.S. Pat. No. 5,818,397.

The advertisements displayed to users are not correlated with a user's e-mail in anyway. Thus, the advertisments can be regarded as context independent. The e-mail messages come from a different source than that of the advertisements (e.g., the e-mail messages originate from other network users, while the advertisements originate from advertisers). Advertisements that are tranferred to a client computer are not in anyway related to the content of the e-mail messages that may be transferred to or from the client computer. There need not be any correlation between the number of e-mail messages sent and/or received and the number of advertisements transferred to or stored at the client computer. In the representative embodiment, advertisements are stored at the client computer in a different subdirectory to that of e-mail messages, and are not linked to any particular e-mail message or messages. Control of the display of e-mail messages is independent to that of the control of the display of advertisements—the client program determines which advertisements to display and at what times, whereas the user determines which e-mail message to read and when to read and write e-mail messages. The content of the e-mail message that is read or written by a user is unrelated to the content of any advertisement that is displayed, e.g., a user could be reading an e-mail message about a vacation in Paris and the advertisement which is displayed may be for shampoo.

Further, users who do not receive any e-mail messages are shown advertisements, e.g., when writing and sending e-mail messages, and when checking to see if any e-mail messages have been received.

In the representative embodiment, a user's e-mail messages are stored on one of many mail servers. The client computer stores switching information that allows the client computer to contact to the mail server that stores the e-mail messages for its user directly through the use of an intelligent network. This switching information is referred to as a "binding" between the client and server computers. By having each client computer maintain this binding, connections go directly to the data source instead of through a gateway or switch, eliminating a level of indirection (i.e., the use of an expensive server to route the connection) or the need for caching on the gateway. The binding mechanism of the present invention offers greater scalability by exploiting the fact that the association between the client computer and the server computer needs to be changed only occasionally.

BRIEF DESCRIPTION OF THE DRAWINGS

FIG. 7 shows a portion of an exemplary survey to create a member profile.

DETAILED DESCRIPTION

Figure 1:
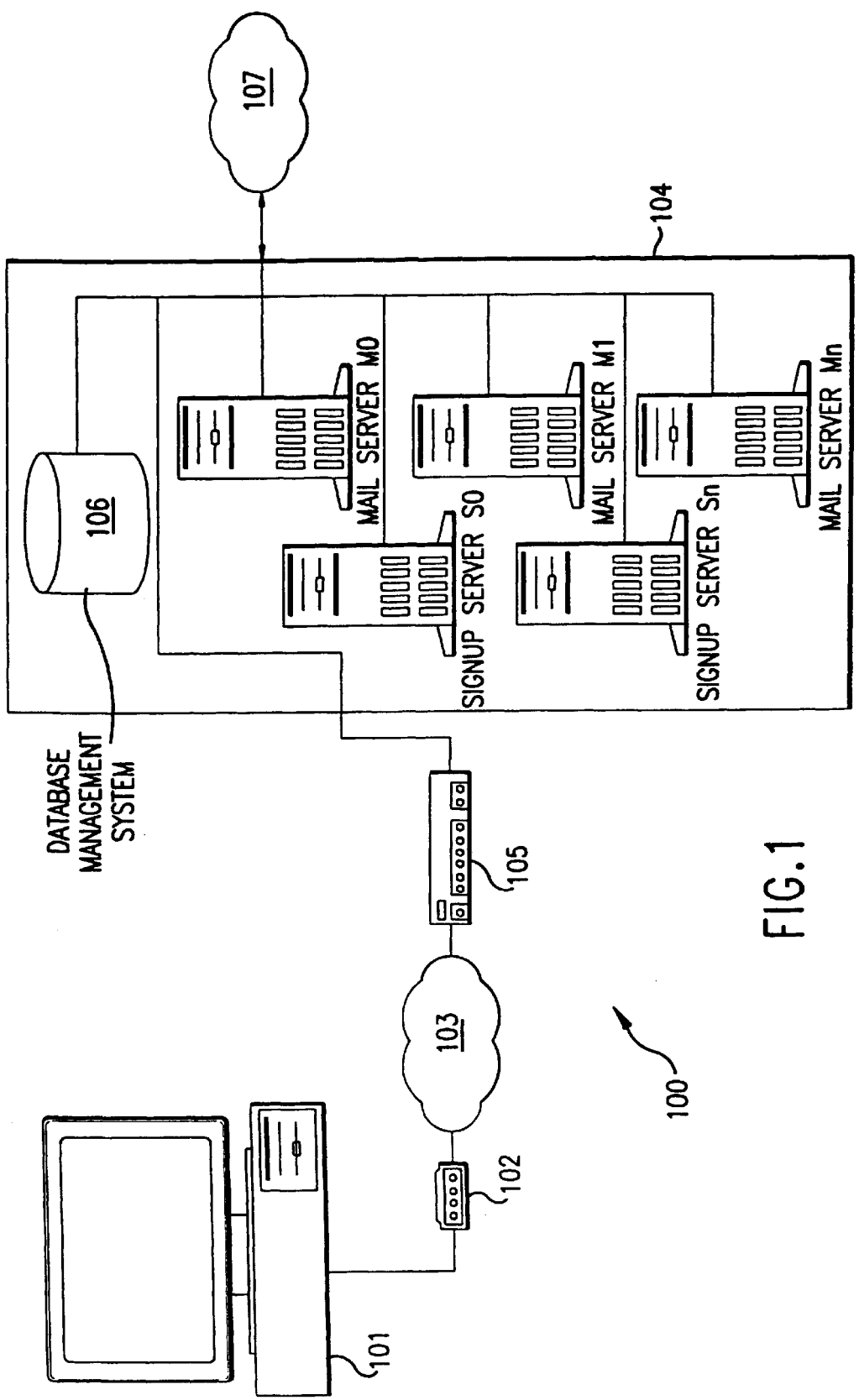
FIG. 1 is a system diagram of a representative embodiment of the present invention.

Referring now to the drawings, FIG. 1 illustrates an exemplary system configuration 100 of a representative embodiment of the present invention. The representative embodiment is described in reference to an electronic mail system where a number of users can create, send, receive and read e-mail messages. E-mail messages can be sent between users of the present invention and external users who have e-mail accounts. However, the principles of the present invention should not be regarded as limited solely to e-mail systems. For example, the principles of the present invention apply to on-line services that present advertising to users while the user is accessing other content. Thus, an e-mail message may be regarded as an example of content provided to a user.

As shown in FIG. 1, a client computer 101, preferably a workstation or personal computer, executes a client program. The client computer can be used by one or more users.

Connected to the client computer 101 is a communication interface 102 for allowing the client computer 101 to communicate with other computer systems. The communication interface may be, for example, a modem operating at 14.4 or 28.8 kilobits per second. As illustrated, the communications interface 102 is external to the client computer 101, but a communication interface 102 that is internal to or part of the client computer 101 is also acceptable. Although the communication interface 102 illustrated is a modem, the communication interface 102 alternatively could be a network interface unit or a network card or the like for providing connectivity to other computer systems over a network using such protocols as X.25, Ethernet, or TCP/IP, or any device that allows, directly or indirectly, computer-to-computer communications.

The client computer 101 is coupled via the communications interface 102 to a network 103. In the representative embodiment, the network 103 is the public telephone network, but it may be, for example, a proprietary wide area network or the like.

Figure 2:
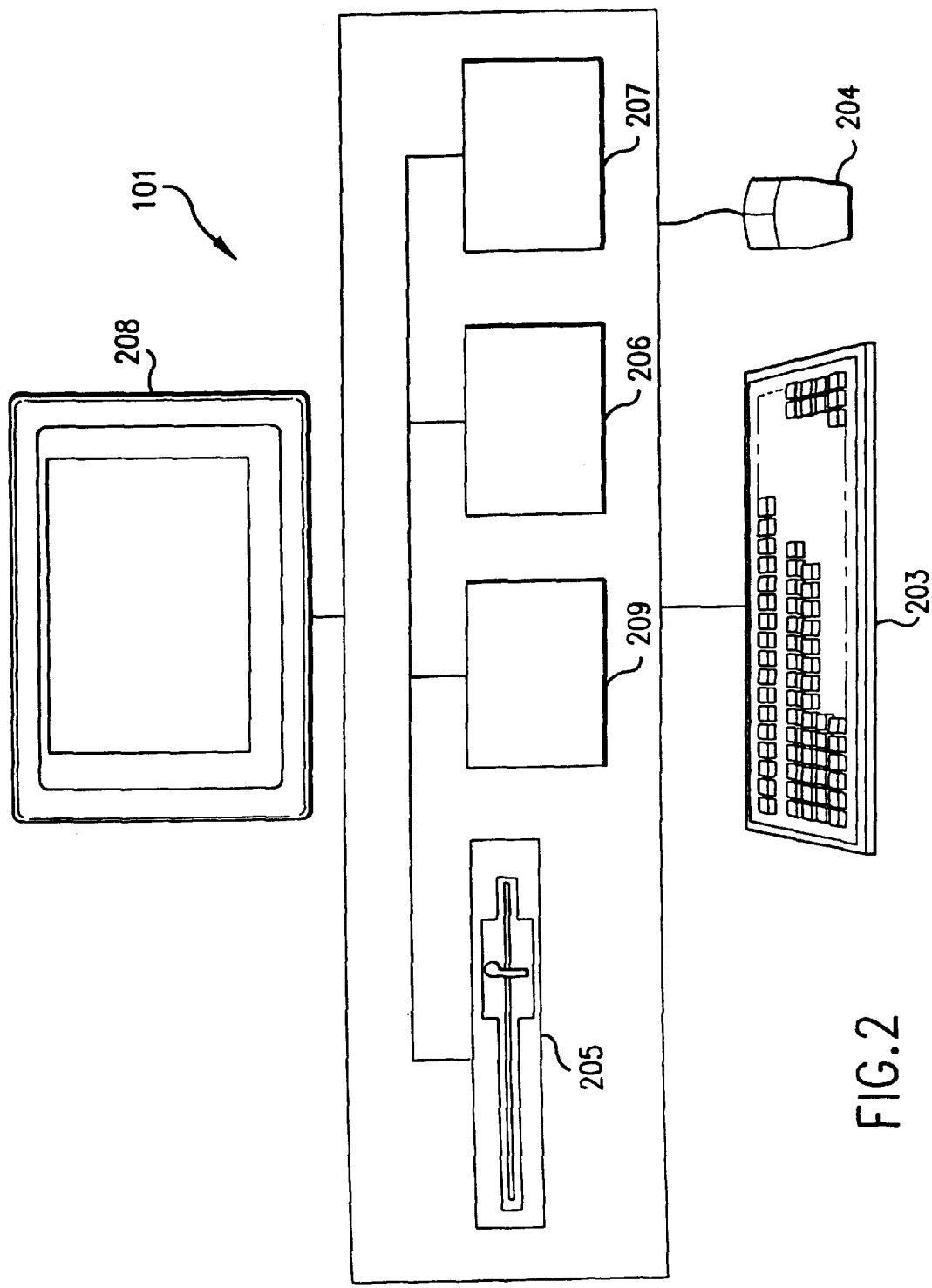
FIG. 2 is a block diagram of the client computer of FIG. 1.

FIG. 2 illustrates in further detail the hardware configuration of the client computer 101 of FIG. 1. In the representative embodiment, the client computer 101 comprises a central processing unit 209 for executing computer programs (including the client program according to the present invention) and managing and controlling the operation of the client computer 101. A storage device 205, such as a floppy disk drive, is coupled to the central processing unit 209 for, e.g., reading and writing data and computer programs to and from removable storage media such as floppy disks. Storage device 206, coupled to the central processing unit 209, also provides a means for storing computer programs and data. Storage device 206 is preferably a hard disk having a high storage capacity. A dynamic memory device 207 such as a RAM, is coupled to the central processing unit 209. The client computer 101 includes typical input/output devices, such as, for example, a keyboard 203, a mouse 204 and a monitor 208.

Referring again to FIG. 1, the client computer 101 selectively communicates with a server system 104 over the network 103 using the communication interface 102. The server system 104 is coupled to the network 103 via a communications server 105.

Although FIG. 1 shows only one client computer 101, it will be appreciated that the representative embodiment of the present invention can include many client computers 101 each capable of being coupled to the server system 104.

The server system 104 is preferably a computer system designed to communicate electronic mail (e-mail) messages. In the representative embodiment, the server system 104 is coupled to one or more external networks 107, such as the Internet, that allow for the sending and receiving of e-mail messages. The server system 104, acting as an intermediary, receives e-mail messages from and causes e-mail messages to be sent to users who have established an account with the server system 104 and with external parties with e-mail addresses, such as Internet users or users of proprietary on-line services.

According to the present invention, the server system 104 also provides other information to and receives information from users of client computers 101, such as, for example, advertisements, software patches, statistical information, etc., as discussed in detail below.

In the representative embodiment, the server system 104 comprises a plurality of mail servers M0-Mn. Each mail servers M0-Mn stores e-mail messages for users of client computers 101 who have established an account with the server system 104.

Received e-mail messages, addressed to users who have accounts with the server system 104, are stored in the mail servers M0-Mn. According to the representative embodiment of the present invention, each user is assigned to one mail server M0-Mn. Messages received for a user who has an account with the server system 104 are stored in a directory on the mail server M0-Mn assigned to that user account. Each received e-mail message is stored in a file in the intended recipient's directory until the intended recipient requests received e-mail messages, as discussed below.

E-mail messages sent from a user are stored temporarily on a disk at the server system before transmission to the intended recipient.

One or more of the mail servers M0-Mn is preferably configured to transmit e-mail messages to and receive e-mail messages from non-users of the server system 104 (e.g., users of other e-mail systems) via external networks such as the Internet 107.

The server system 104 of the representative embodiment includes a database management system 106, coupled to each of the mail servers M0-Mn. The database management system 106 manages and stores information related to the operation of the present invention, such as, for example, member profile information, advertisement information, information used to bill advertisers, etc. The database management system 106 preferably includes a plurality of high capacity storage devices for storing and managing large amounts of data. (The hardware configuration of the database management system 106 can easily be varied, and may comprise, for example, a single processor coupled to a high speed storage device, or a distributed system comprising a plurality of servers.)

Alternative configurations of the server system 104 can be accommodated by the present invention. For example, e-mail messages may be stored centrally in a database management system such as the database management system 106 of the server system 104. Thus, each time a user connects to the server system 104, that user's received e-mail messages are retrieved from a central storage location.

In the representative embodiment of the present invention, the server system 104 also includes a plurality of signup servers S0-Sn. The signup servers S0-Sn allow for communication with first time users, preferably establishing and activating user accounts and providing new users with "binding" information (as described below).

Figure 3:
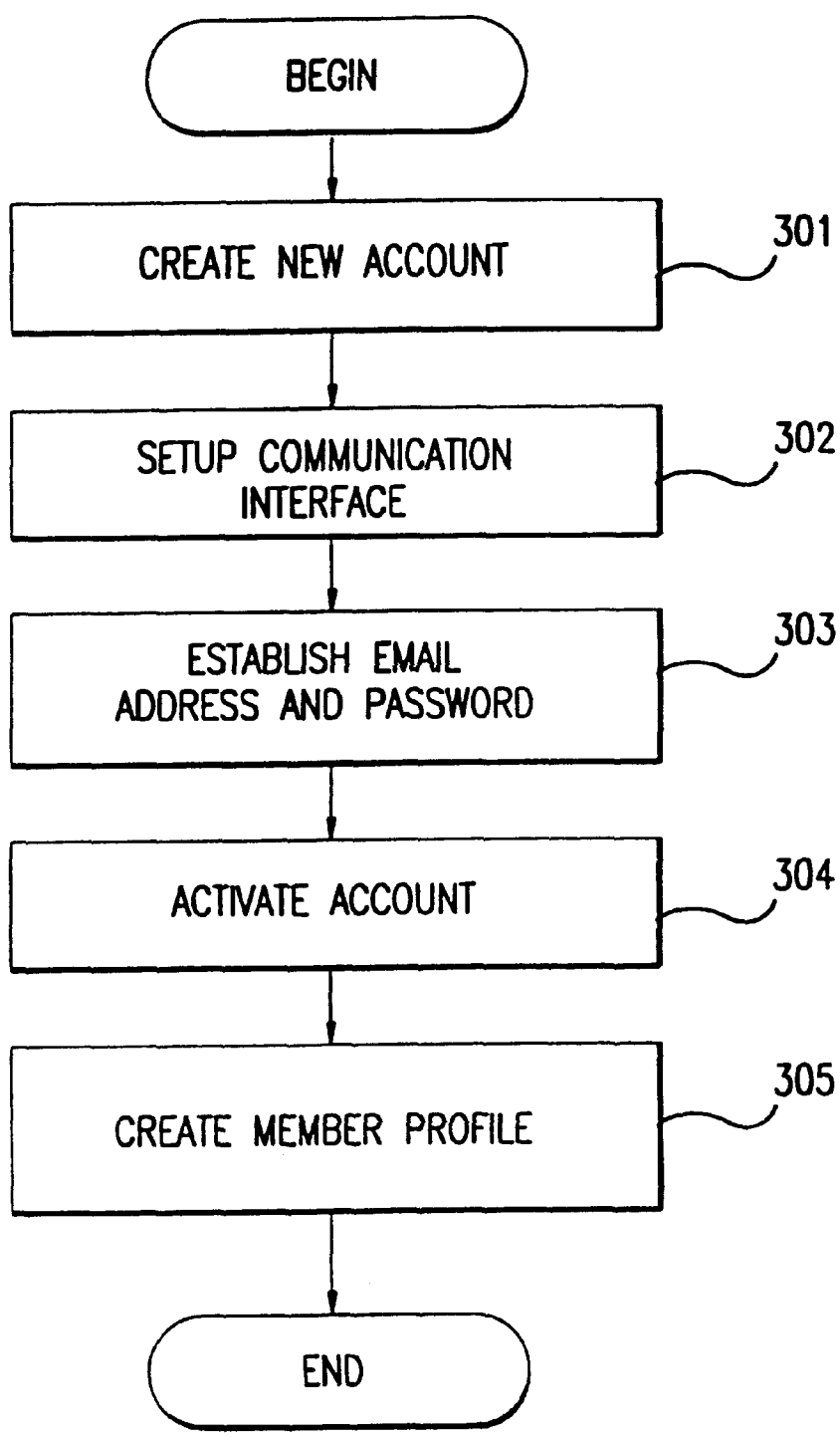
FIG. 3 is a flowchart of the client computer initialization process.

FIG. 3 illustrates, in flow chart form, the installation and account creation steps that take place at a client computer 101. Typically, the user is provided (e.g., on disk or electronically downloaded over the Internet) with a copy of a software program (the client program) that is executed by the client computer 101 according to the principles of the present invention. The user will install the client program on the client computer 101, for example, by executing an install program. The install program will create a directory on the storage device 206 and load the client program into that directory. In the representative embodiment, the install program will determine if there is enough space in the storage device 206 to install the client program and to later download advertisements. For example, the install program will set aside five megabytes of storage space on the storage device 206 for advertisements. This will ensure that there is a minimum amount of storage space available for the required number of advertisements that may be downloaded and stored in the future. The install program may also determine if the client program has previously been installed and if an old version of the client program has been installed that requires updating.

The client program and associated files are organized on the storage device 206 of the client computer 101 in a plurality of sub-directories. For example, assuming that the directory in which the client program is installed is named "mail", then in the representative embodiment, sub-directories of "mail" include "ads", "bad", "bin", "lib", "tmp", "user0". The "ads" subdirectory stores advertisements and an ad log recording statistics relating to advertisements. The "bad" subdirectory stores files not recognized by the advertisement system. The "bin" subdirectory stores the executable client program and related "dll" files. The "lib" subdirectory stores help files, modem configuration files, and bitmap images used in the display of the graphical user interface. The "tmp" subdirectory is used for temporary files. The "user0" subdirectory is a subdirectory created when a user establishes an account. Each time a user creates a new account (or a different user creates an account using the same client computer 101), a new subdirectory is created for that user account, e.g., "user1", "user2", etc. The "user" subdirectory includes an e-mail address book file, a user preferences and configuration file, and "get" and "put" subdirectories are "spooling" directories where data is temporarily stored while in transit between the client computer 101 and the server system 104.

Because files associated with the present invention are stored at the client computer 101, especially files comprising advertisements and usage information, a user may accidentally or maliciously delete, tamper with or add to such files and/or subdirectories. Accordingly, the present invention includes an authentication scheme to prevent and/or detect certain undesirable modifications. One such authentication scheme is disclosed in co-pending patent application entitled "Advertisement Authentication Scheme In Which Advertisements Are Down-loaded For Off-Line Display," in the names of Jon D. Mc Auliffe, Brian D. Marsh and Mark. A Moraes, Ser. No. 08/635,275, now U.S. Pat. No. 5,838,790, filed concurrently herewith, and expressly incorporated herein by reference.

Advertisements may be displayed to the user during installation.

Once the client computer software has been installed, the user can initiate local execution of the client computer software. In the representative embodiment, the client computer software operates in a graphical user interface (GUI) environment such as Microsoft Windows, Mac/OS, OS/2 and the like.

The first time that the client computer software is executed on the client computer 101 (and whenever a user wishes to establish a new account with the server system 104), the client program performs various function intended to establish a new account for the user. In the representative embodiment, the first step is to collect new account information (step 301). At the request of the client program, the user inputs name, address, telephone number and other identification data. This information is stored on storage device 206.

Next, the client program configures the communication interface 102 to operate with the client program (step 302). For example, the client program may ask the user to identify the modem and modem speed or may autodetect the modem and modem speed. The user may also be asked to identify the type of telephone line (e.g., tone or pulse) and whether one must dial a certain number to reach an external line.

The client program requests that the user select an e-mail address and password (step 303).

Figure 4:
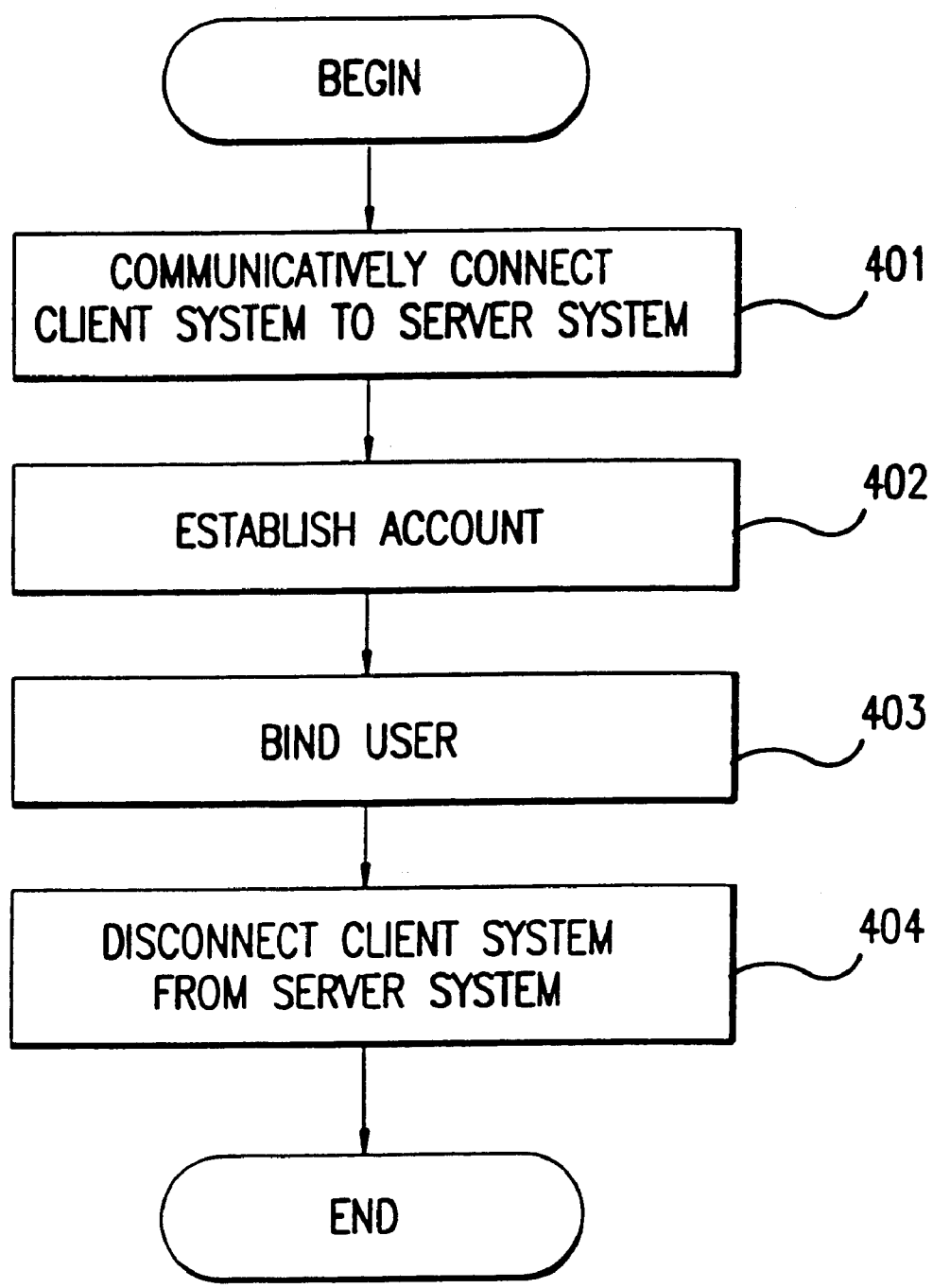
FIG. 4 is a flowchart detailing account activation.

The client program then initiates a connection with the server system 104 to activate an account for the user (step 304). FIG. 4 illustrates this activation step in further detail. The client computer 101 establishes communication with the server system 104 via the communication interface 102 (step 401). In the representative embodiment, first time users interfacing with the server system 104 are coupled to one of the plurality of signup servers S0-Sn. The particular signup server Sx that the user is first connected is selected by the server system 104 in a round robin fashion.

On first time use, the client program passes to the server system 104 the selected user name and password. Signup server Sx establishes an account for the user, e.g., queries the database management system 106 to determine whether the requested e-mail address is unique to the server system 104, and if it is, creates an entry in the database management system for that user (step 402). Signup server Sx then assigns (or "binds") the user to one of the plurality of mail servers M0-Mn (step 402). The binding information (e.g., the identity of the mail server) is transmitted to the client computer 101 and stored on the storage device 206 for later use.

After the account has been activated, the client computer disconnects from (i.e., terminates communication with) the server system 104 (step 404), and in particular disconnects from signup server Sx.

Referring again to FIG. 3, once the user's account is activated (step 304), the user is asked to complete a member profile (step 305). This step takes place when the client computer 101 is off-line, i.e., not connected to the server system 104. In particular, the client computer 101 requests that the user provide information such as interests, hobbies, recent purchases, demographic information, etc., in the form of a survey. FIG. 7 shows as an example of one portion of a representative survey. Illustrated is question fifteen 701 of the member profile. The user responds to the illustrated question 701 by clicking on the appropriate circle next to each option, thus "filling in" the circle. For example, in response to "What sorts of programs do you like to watch on TV?,"—if the user watches "News" 702, the user clicks on the circle representing appropriate answer. Thus, if the user watches the "News" 702 often, he clicks on circle 703. After clicking on all the appropriate circles representing responses, the user may move ahead in the profile—that is, to the next questions—by clicking on a "Next >" button 704. If the user wants to go back to earlier questions and responses, possibly to change an answer, the user clicks on a "<Back" button 705.

The user's responses (i.e., the completed member profile) are stored on the client computer 101 storage device 206 for future transmission to the server system 104. In the representative embodiment, the member profile is transmitted to the server system 104 when the user first sends or receives e-mail. The information can be used by the server system 104 to aid in selecting or targeting advertisements and e-mail messages containing advertisements to desired users. The member profile can be updated by the user and will then be transmitted to the server system 104 when the user next connects with the server system 104 to sent or receive e-mail messages. When transmitted, the member profile is stored at the server system 104 on the database management system 106.

Once the member profile is completed, initialization is complete. The user at the client computer 101 can now create, send, receive, and read e-mail messages.

It will be appreciated that in alternative embodiments, the member profile may be transmitted to the server system 104 at step 304 along with the selected e-mail address and password.

Figure 5:
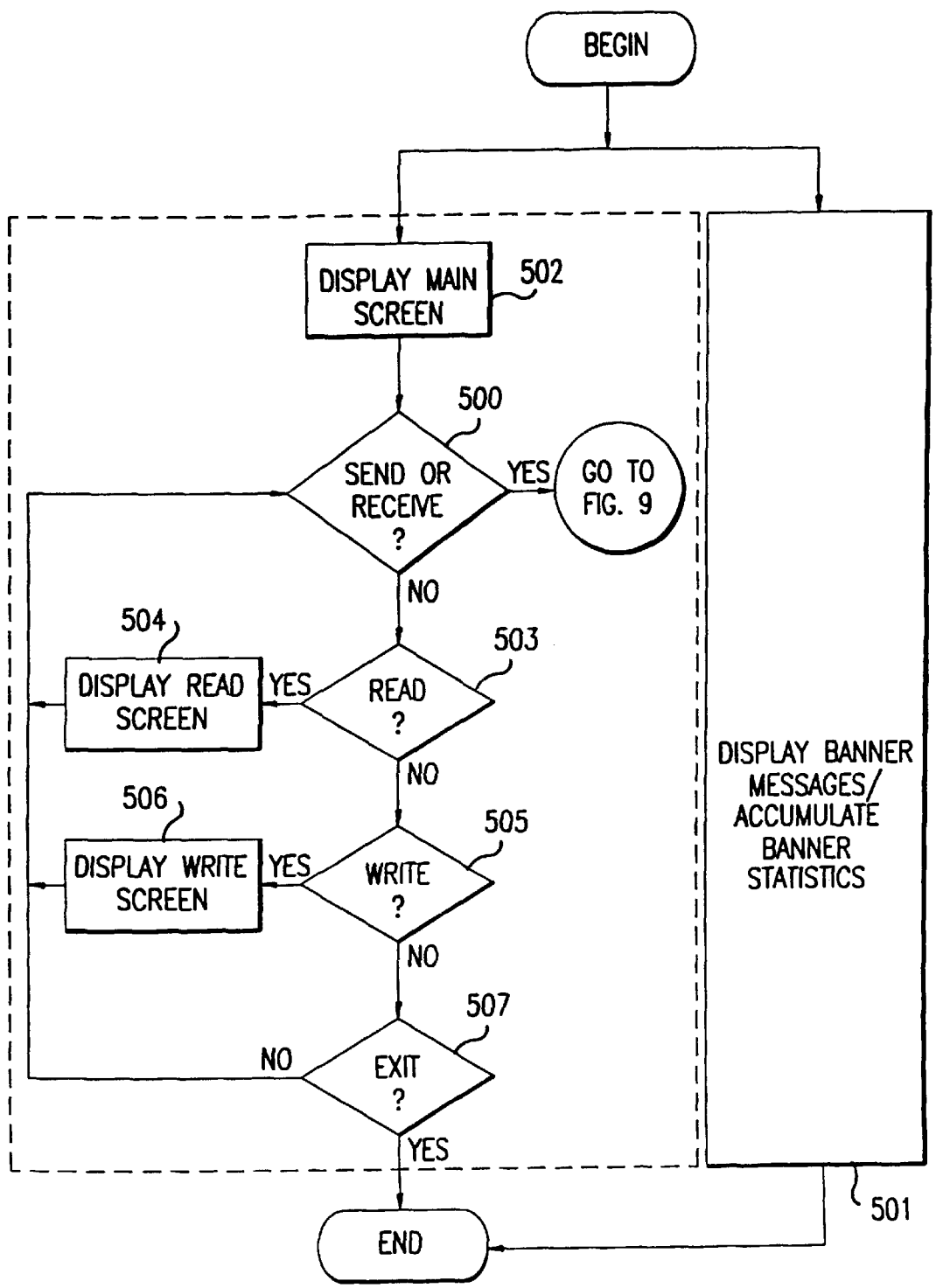
FIG. 5 represents actions that take place at the client computer.

FIG. 5 illustrates, in flow chart form, typical steps followed by the client computer 101 when the client software is executed after the initial sign-up process. This flow chart is for purpose of explanation and does not necessarily reflect all possible paths of control flow in the execution of the client program.

The client computer 101 displays advertisements on a portion of the user's display terminal 202 (step 501). As illustrated, advertisements are displayed continuously during the operation of the client software, and in particular, when the client computer 101 is not in communication with the server system 104. This is possible because the advertisements are stored on the client computer 101.

In the representative embodiment there are two types of advertisements. Banner advertisements 800 are displayed at step 501 when the user is reading and creating e-mail messages, or performing other administrative tasks, e.g., moving e-mail messages between folders. In the representative embodiment, banner advertisements 800 are displayed in a box at the top right side of the window (see FIGS. 8 and 12). Showcase advertisements are displayed whenever the user is attempting to establish a connection with the server system 104 and when information is being transferred between the client computer 101 and the server system 104. The banner and showcase advertisements may be textual, graphical, or video data (or combinations thereof) and may be stored in a standard compressed data format, such as JPEG or MPEG, or in a proprietary format, or in an uncompressed format. Typically, advertisements are simple graphics files. Sounds may also be included.

The banner advertisement 800 shown to the user prior to sending or receiving e-mail messages for the first time can be an advertisement previously received from the server system 104 (e.g., during the account creation process) or an advertisement obtained from the installation disk. The banner advertisement 800 displayed is stored in a file on storage device 206 (e.g., in the "ads" subdirectory). The stored banner advertisements 800 can be stored in a compressed format and decompressed immediately prior to display.

In the representative embodiment, each banner advertisement 800 is replaced by another one of the stored banner advertisements after a predetermined time has elapsed. The banner advertisement is continuously updated or replaced by the client computer 101 while the client program of the present invention is executing. Each banner advertisement 800 is displayed for a predetermined time and in accordance with a schedule that is preset or determined by the client program "on-the-fly".

The banner advertisements 800 may be interactive. For example, by clicking on the banner advertisement 800, the user may be provided with further information concerning the subject matter of the current banner advertisement 800. The further information may be, for example, another related banner advertisement 800 stored on storage device 206.

By clicking on the banner advertisement 800, the user may be provided with an e-mail message template to create an e-mail message (as described in connection with FIG. 12 below), having the addressee already filled in with the e-mail address of a company associated with the subject matter of the current banner advertisement 800. In this manner, the user may, for example, provide comments to the company regarding the subject matter of the banner advertisement 800 or request further information. Alternatively, clicking on the banner advertisement 800 may cause an e-mail message to be automatically completed (including the message) and either transmitted immediately or stored in the user's "outbox" folder (described later). The message may merely identify the user to the addressee of the e-mail message as someone interested in the subject matter of the banner advertisement 800.

In accordance with the representative embodiment, advertisements are preferably described in a file using a page description language ("PDL"). The PDL is a simple notation for describing the graphical objects or elements that form each advertisement. Accordingly, associated with each advertisement is a file containing the advertisement's description written in the PDL. A specification for a representative PDL is illustrated below:

| | |
|---|---|
| Type: | Page Head |
| Name: | Name of the page |
| Width: | width of page in pixels |
| Height: | height of page in pixels |
| Color <optional>: | color |
| File Name <optional>: | file name |
| ... | |
| Type: | Text |
| Name: | Name of the element |
| Left: | position w/r/t left side of ad page |
| Top: | position w/r/t top of ad page |
| Width: | width of text in pixels |
| Height: | height of text in pixels |
| Text: | textual message |
| Font <optional>: | font |
| Font Style <optional>: | Bold \| Italic \| underline \| Strikeout |
| Font Height <optional>: | font height in pixels |
| FG Color <optional>: | text color |
| BG Color <optional>: | background color |
| Justify <optional>: | Right \| Center \| Left (default) |
| ... | |
| Type : | Button |
| Name : | Name of the element |
| Left: | position w/r/t left side of ad page |
| Top: | position w/r/t top of ad page |
| Width: | width of text in pixels |
| Height: | height of text in pixels |
| Text : | textual message |
| Up <optional>: | file name of bitmap for button in up position |
| Down <optional>: | file name of bitmap for button in down position |
| Focus <optional>: | file name of bitmap for focus button |
| OnClick/Action: | action to be performed when user clicks the button. Choose one action of the following: |
| | pdl modal <file name> create new dialog to display the new ad |
| | pdl inherit <file name> use the current dialog to display the ad |
| | log <an id assigned to the ad> log an event to the ad log to be processed by the server |
| | request <recipient E-mail> <subject line> compose a message and put it into user's outbox |
| | mail <recipient email> <subject line> switch to the writer, fill in the To and Subject |
| | msg <message text> display a message |
| Message <optional>: | message to be displayed when user clicks the button |
| Data: | specify any auxiliary data for the action |
| Font: | font |
| Font Style: | Bold \| Italic \| Underline \| Strikeout |

-continued

| | |
|---|---|
| Font height: | font height in pixels |
| . . . | |
| Type: | HotSpot |
| Name: | Name of the element |
| Left: | position w/r/t left side of ad page |
| Top: | position w/r/t top of ad page |
| Width: | width of text in pixels |
| Height: | height of text in pixels |
| Text : | textual message |
| OnClick/Action: | action to be performed when user clicks the hotspot. Choose one action of the following: |
| | pdl modal <file name> :create new dialog to display the new ad |
| | pdl inherit <file name> :use the current dialog to display the ad |
| | log <an id assigned to the ad> log an event to the ad log to be processed by the server |
| | request <recipient email> <subject line> : compose a message and put it into user's outbox |
| | mail <recipient email> <subject line> : switch to the writer, fill in the To and Subject |
| | msg <message text> : display a message |
| Message <optional>: | message to be displayed when user clicks the hot spot |
| Data: | specify any auxilary data for the action |
| . . . | |
| Type: | Background |
| Name: | Name of the element |
| Left: | position w/r/t left side of ad page |
| Top: | position w/r/t top of ad page |
| Width: | width of text in pixels |
| Height: | height of text in pixels |
| Color: | color |
| File name <optional>: | specify the bitmap to use or the bitmap which contains the background color |
| Type: | BMP |
| Name: | Name of the element |
| Left: | position w/r/t left side of ad page |
| Top: | position w/r/t top of ad page |
| Width: | width of text in pixels |
| Height: | height of text in pixels |
| File name: | the bitmap file |
| Wipe <optional>: | TRUE (do wipe with any of the available wipe modes) FALSE (no wipe) \|LTOR (left to right) \|RTOL (right to left) \|MID (expand from middle) \|END (start from two ends) |
| . . . | |

In the representative embodiment, all advertisement definitions include a "Page head" and may include one or more of the other illustrated types.

Type: Page Head:

"Page Head" defines the basic structure of the advertisement including the "Width" and "Height" of the advertisement, as well as the color ("Color" or "File Name" fields).

Type: Text:

"Text" specifies a text string at a particular location. The "Name" field defines an identifier for the "Text" object being defined. The "Left" and "Top" fields indicate the position of the text string within the advertisement. "Width" and "Height" provide the dimensions of the text. The "Text" field specifies the text string to be displayed. The "Font," "Font Style," and "Font Height" fields identify textual font information. "FG Color" and "BG Color" identify the color of the text and the color of the background respectively. The "Justify" field specifies the text justification.

Type: Button:

"Button" defines a clickable GUI button. The "Name" field specifies an identifier for the button being defined. "Left" and "Top" specify the position of the button while "Width" and "Height" define the dimensions of the button.

The "Text" field specifies a text string to be displayed on the button. For a bitmap button, "Up," "Down," and "Focus" specify bitmaps for the button in the up, down, and focus positions respectively.

The "OnClick/Action" field specifies the action to be performed when a user clicks on the button. One of six actions may be performed. If "pdl modal <file name>" is specified, a new dialog is created to display a new advertisement. The file name specified is the file containing the definition of new advertisement. If "pdl inherit <file name>" is specified, the current dialog is used to display the new advertisement defined in file "file name." If "log" is specified, an event is logged into the ad log.

"Request <recipient email> <subject line>" causes the client computer to automatically compose an e-mail message addressed to the identified "recipient." The subject of the e-mail message is filled in with the text specified in the second parameter, i.e., subject line. The e-mail message is then put into the user's outbox.

If "mail <recipient email> <subject line>" is defined as the action to be performed, the client computer switches to the "write" screen, automatically filling in the address and the subject of an e-mail message. The user can then fill in the message body.

Finally, if "msg" is specified, a textual message is displayed to the user when the user clicks the button.

The "Message" field for type "Button" specifies a message to be displayed when the user clicks on the bottom.

The "Data" field identifies auxilary data for the action.

Additionally, for each button, "Font," "Font height," and "Font style" may be specified for the button text.

Type: Hotspot:

"Hotspot" is similar to a GUI button and is defined in a fashion similar to a button.

Type: Background:

"Background" is used to fill a specified rectangle with a selected color or identifies a bitmap to fill the specified rectangle. The "Left" and "Top" fields define the position of the background while the "Width" and "Height" fields define the dimensions of the background. The "Color" field identifies the color of the background. The "File name" field identifies a bitmap to use to fill in the rectangle.

Type: BMP:

"BMP" specifies a bitmap. The "Left" and "Top" fields define the position where the bitmap is to be displayed while "Width" and "Height" define the display dimensions of the bitmap. The "File name" field identifies the bitmap file. Finally, the "Wipe" field specifies if the bitmap is to wipe when display, and if so, how it should be wiped.

The client computer 101 also logs statistics regarding the advertisements displayed (also step 501) in a file stored on storage device 206. For example, each time a new banner advertisement 800 is displayed, the client computer 101 logs the identification of the banner advertisement 800, the time and date it was displayed, and duration of the display.

Figure 8:
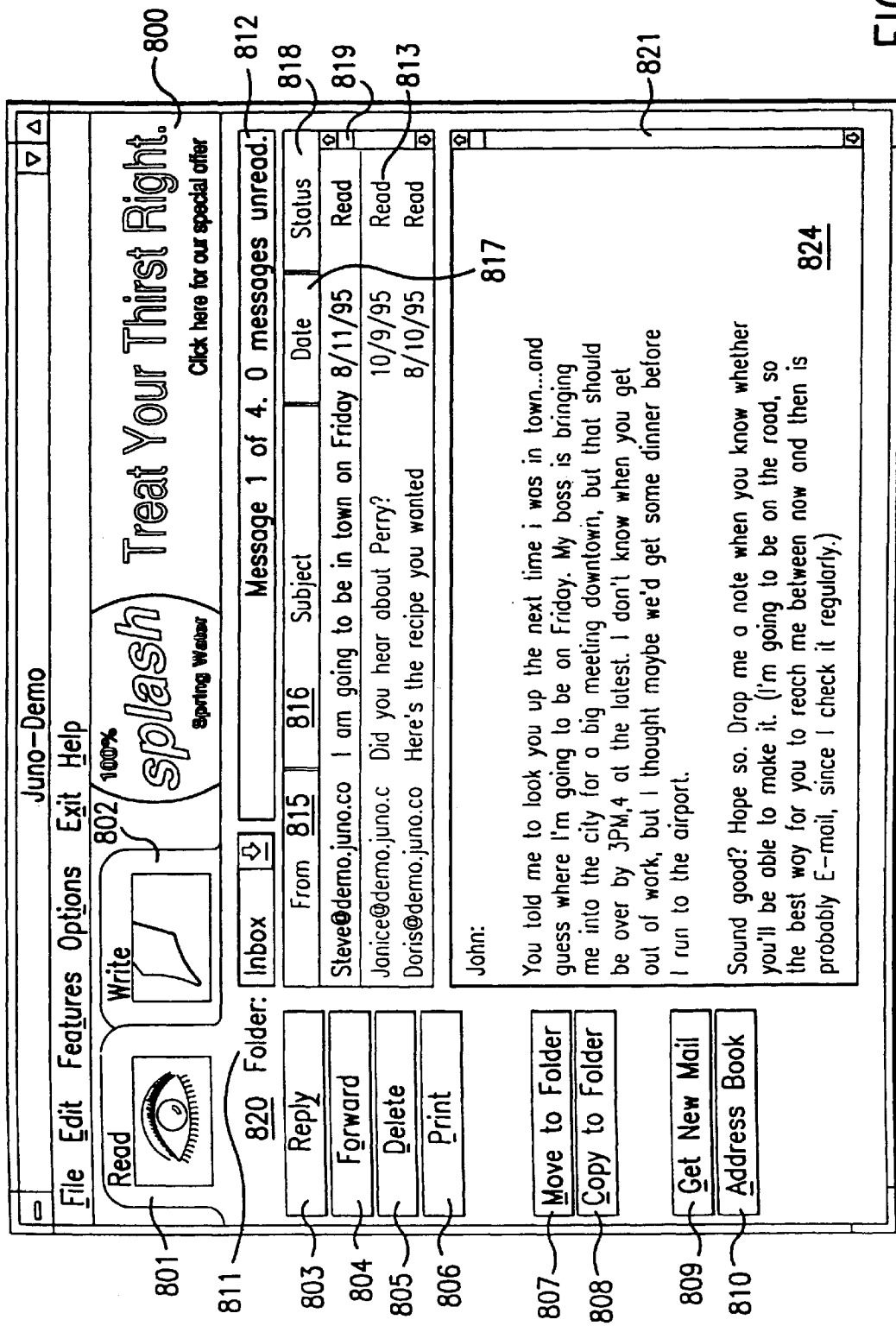
FIG. 8 illustrates an example read screen used to read received e-mail messages.

While the banner advertisement 800 is displayed, the user can read and create e-mail messages using a graphical user interface of the present invention (steps 500 and 502–507). At step 502, the client program causes a main screen to be displayed. FIG. 8 is a representative example of a typical main screen.

As illustrated in FIG. 8, the user is presented with two "tabs" representing main system functions, a read tab 801 and a write tab 802. Clicking on read tab 801 (step 503) or write tab 802 (step 505) causes a screen for either reading or creating e-mail messages to be displayed. In FIG. 8, the read tab 801 has been selected, thus allowing the user to read e-mail messages that have been transferred to the client computer 102. Thus, from FIG. 8, if the user selects the write tab 802 (step 505), a write screen 1220 is displayed as in FIG. 12 (step 506). From FIG. 12, if the user selects the read tab 801, a read screen 820 is displayed as in FIG. 8 (step 504).

When the read screen 820 is displayed, the user can read e-mail messages that have been transferred to the client computer 101. When the write screen 1220 is displayed, the user can create e-mail messages. It will be appreciated that reading and creating e-mail messages is done off-line, and that banner advertisements 800 are displayed to the user and updated while the user is reading and creating e-mail messages. E-mail messages that are created can be textual, graphical, and may include attached files.

Referring now to the read screen 820 of FIG. 8, the user at client computer 101 is presented with various read subfunctions displayed as clickable buttons labeled "Reply" 803, "Forward" 804, "Delete" 805, "Print" 806, "Move to Folder" 807, "Copy to Folder" 808, "Get New Mail" 809, "Address Book" 810. In the representative embodiment, e-mail messages are stored in folders, e.g., an Inbox folder for received e-mail messages and an Outbox folder for unsent e-mail messages. The user may create additional folders, and move e-mail messages between folders. The folders are subdirectories in the subdirectory allocated to a particular user (e.g., subdirectory "user1") of the client computer 101.

The read screen 820 displays the name of the current e-mail folder 811, a status display 812 showing the status of e-mail messages stored in the current e-mail folder 811, an e-mail list 813 showing a list of the e-mail messages stored in the current e-mail folder, and an open e-mail text box 824 displaying the content (e.g., text) of a selected e-mail message.

Information concerning e-mail messages stored in the current folder is displayed in an e-mail list 813. The information preferably includes the user name and address of the sender ("From" 815), the subject of the e-mail message ("Subject" 816), the date of the e-mail message ("Date" 817), and the status of the e-mail message ("Status" 818). As shown in FIG. 8, information concerning only three e-mail messages is displayed, but the user can scroll through information concerning other e-mail messages stored in the folder using scroll bar 819.

By selecting (e.g., clicking on) one of the displayed list elements in e-mail list 813, the user can "open" the corresponding e-mail message. Once opened, the content of the e-mail message is displayed in the e-mail text box 824. The user can scroll through the content of the message using scroll bar 821.

Once an e-mail message is open, the user can read the message and choose to reply to the message by clicking on the reply button 803. This opens the write screen 1220 (FIG. 12) and creates a template for an e-mail message, with the addressee field completed. In particular, if a user replies to the e-mail message highlighted in FIG. 8, the reply e-mail message will be addressed to "Steve@demo.juno.com". Processing of this new message is similar to that of other e-mail messages created by the user.

The user can also choose to forward the open e-mail message by clicking on the Forward button 804. In response to clicking on the Forward button, the client computer 101 creates a template for an e-mail message and also attaches a copy of the open e-mail message.

The user can also choose to delete the open message by clicking on the Delete button 805. This causes the client computer 101 to erase or remove the file containing the open e-mail message from the storage device 206. In the representative embodiment, the file may be marked as "deleted" and then actually deleted at the end of the user's session.

The open e-mail message can also be printed on a printer that is coupled to client computer 101. To print an e-mail message, the user selects the Print button 806.

Received e-mail messages can be moved to and copied to other folders by clicking on the "Move to Folder" button 807 and "Copy to Folder" buttons 808 respectively. When the "Move to Folder" button 807 is clicked, the user is asked to identify the folder to which the open e-mail message is to be moved. If the user identifies a non-existent folder, the client computer 101 creates a new folder with the name identified by the user and associates the e-mail message with the new folder, removing the e-mail message from the old folder. Otherwise, the open e-mail message is associated with the identified existing folder and is removed from the old folder.

Clicking the "Copy to Folder" 808 copies the open e-mail into a folder identified by the user and leaves the original e-mail message in the old folder.

The user can retrieve new e-mail messages and send created e-mail messages (step 507). The user can choose to retrieve new e-mail messages from the server system 104 by clicking on the "Get New Mail" button 809. The user can choose to send e-mail messages by clicking on the "Send Mail" button 1209 of FIG. 12. (The user is also given the option to retrieve new e-mail messages whenever the user starts the client program.)

Figure 9:
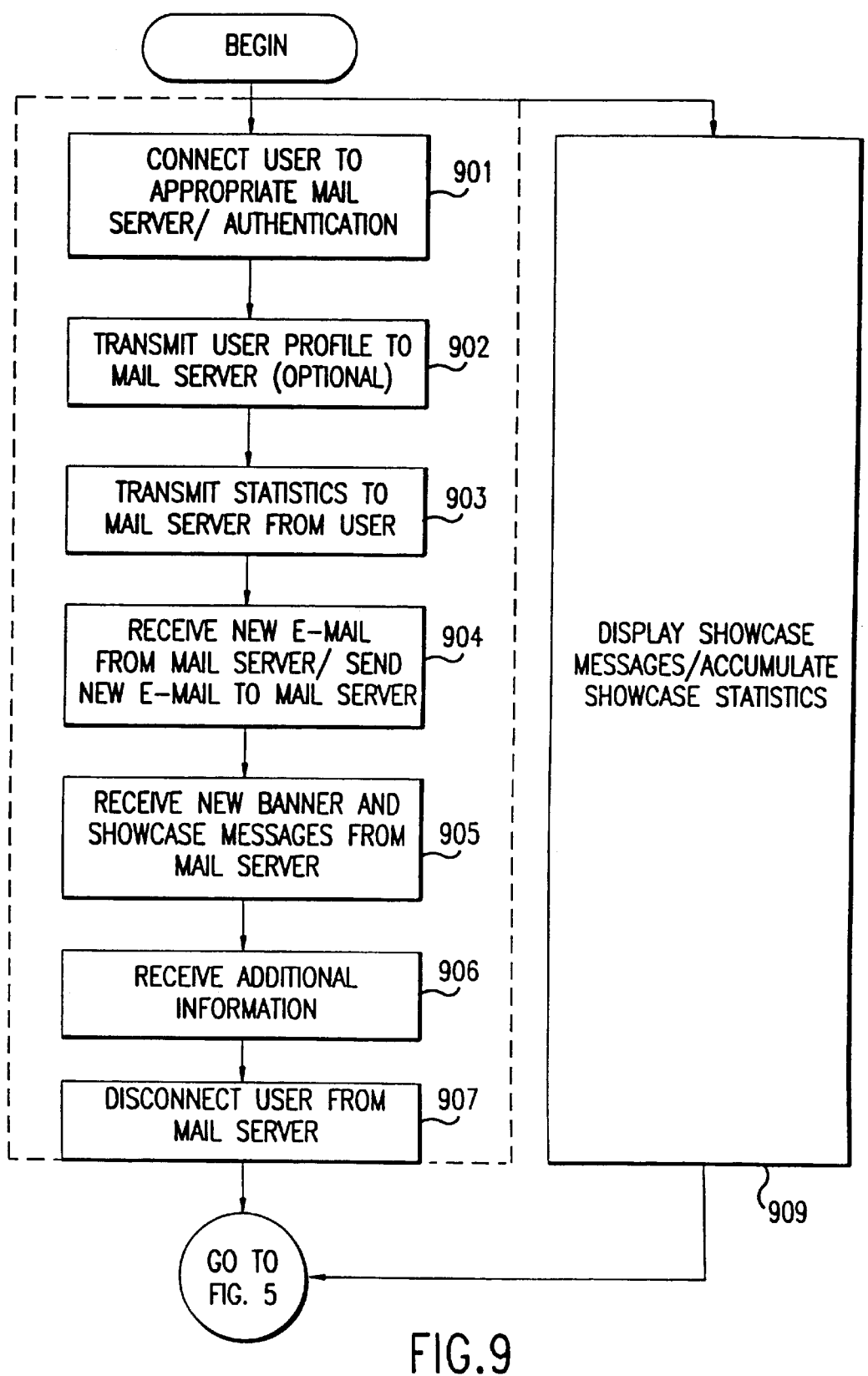
FIG. 9 is a flowchart of the communication process that takes place between the client computer and the server system as performed by the client computer.

FIG. 9 illustrates in detail the steps performed by the client computer when the user sends or receives e-mail messages. When a user decides to send or get e-mail messages, the client computer 101 connects to a mail server M0-Mn of the server system 104 through communications server 105 (step 901). Among the other connection parameters passed from the client computer 101 to the communication interface 102 is the user name and binding information (e.g., the network login) that identifies which of the plurality of mail servers M0-Mn the user's client computer 101 should be connected to. Each user is associated or "bound" to a particular mail server M0-Mn.

Once the client computer 101 is connected to the appropriate mail server M0-Mn, the user must then be "authenticated." Authentication is accomplished using a challenge/response protocol. The mail server issues a challenge to which the client computer 101 responds by computing a keyed hash value of the challenge using the user's password. The client system 101 transmits the user's name and the hash value back to the mail server. The mail server then compares the client's hash value with a hash value it computers locally based on the asserted identity of the user. If it matches, the user is authenticated.

In the representative embodiment, if the server 105 has migrated the user's server-side data to a different mail server M0-Mn, the client computer 101 receives a notification that the binding has changed. This notification includes new binding information. The client then establishes a new connection utilizing the new binding information.

After the client is connected to the appropriate mail server and has been authenticated, the client computer 101 transmits the user's member profile stored on storage device 106 to the mail server for that user if appropriate(step 902). The user's member profile will only be transmitted if it has been modified since the last time the client computer 101 transmitted the profile. The creation of the user's member profile was discussed above in connection with FIG. 3.

The client computer 101 also transmits statistical information to the mail server Mn. In the representative embodiment, the statistical information includes, for example (i) which advertisements are shown to the user, for how long and at what times; (ii) whether any advertisement has been altered by the user or corrupted by the system; (iii) the number of remaining exposures for an advertisement; and (iv) when an advertisement is expired for a user or for all users. This information is stored in an advertisement statistics file. The statistical information may also include (i) when a user activates the client program; (ii) how long the client program was used; (iii) when there is a period of inactivity when the client program is running on the client computer, for example, if the user does not enter an instruction for a period of five minutes; (iv) modem configuration problems; (v) information as to how well the client program functioned; (vi) any communication problems with the server system; and (vii) other statistical information useful to predict a user's future behavior with respect to the client program. This information is stored in an event log file.

As appropriate, e-mail messages are communicated between the client computer 101 and the server system 104 (step 904). The client computer 101 receives (and the mail server transmits) new e-mail messages addressed to the user. The client computer 101 stores each new e-mail messages on storage device 106 and associates the new messages with the Inbox folder. The client computer 101 sends (and the mail server receives) e-mail messages created by the user and stored on storage device 106. In the representative embodiment, these messages were associated with the Outbox folder.

Additionally, new banner and showcase advertisements and corresponding scheduling information can be received by the client computer 101 (step 905) from the mail server Mn, and are stored on storage device 106, in, for example, the "ads" subdirectory. Expired advertisements may be overwritten. The scheduling information may include information such as how many times each message should be displayed to each user, what time of day the message should be displayed, how many days the advertisement remains current and eligible for display, etc.

The new banner and showcase advertisements are not correlated in any way to the user's e-mail. In fact, a user may receive the advertisements even if the user does not receive any e-mail or have any e-mail to send.

The client computer 101 may also receive other information from the mail server Mn (step 906). This other information may be, for example, software patches, modem configuration data, and new POP information. The new POP information allows easy changes and additions to the points of presence (usually modem banks and terminal servers) that enable connections between the client computers 101 and the server system 104.

As the client program may occasionally need to be updated to incorporate new features or correct errors (bugs), software patches are also transmitted to the client computer 101. Thus, when a software patch is available, the client computer 101 receives and stores it, and preferably, applies the update sometime in the future.

POP information includes both dialing scripts and telephone numbers.

Finally, after the client computer 101 has transmitted and received all of the necessary information, the client computer 101 is disconnected from the mail server Mn (step 907).

Figure 10:
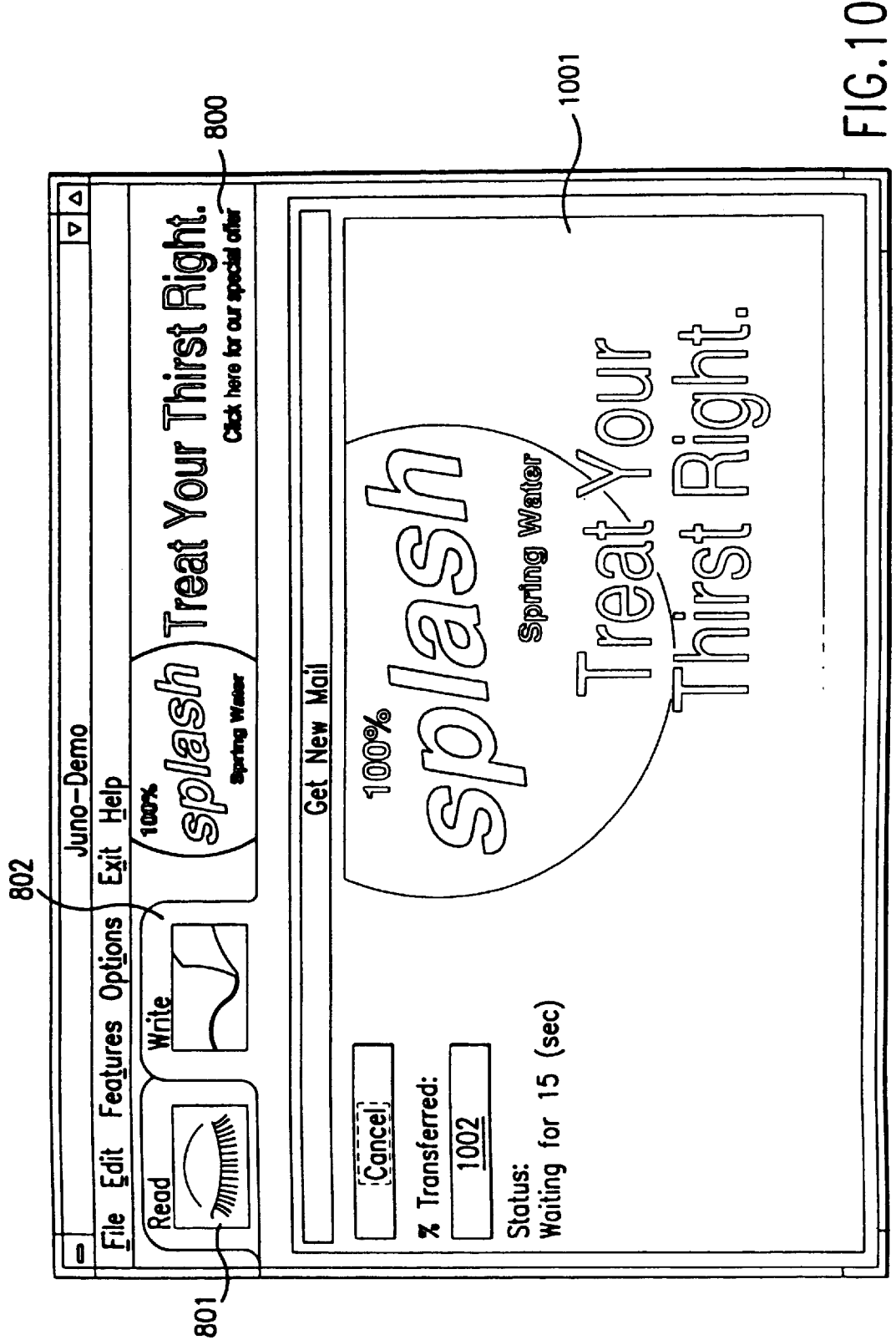
FIG. 10 illustrates an example showcase advertisement.

While the client computer 101 is establishing communications with, and actually communicating with the server system 104 through mail server Mn, showcase advertisements 1001 are displayed to the user. FIG. 10 illustrates a screen display that is shown to the user during steps 901 to 907. Like the banner advertisement 800, the showcase advertisement 1001 can be replaced after a predetermined time, with a different showcase advertisement that is stored on storage device 206. The showcase advertisement 1001 preferably takes up a large portion of the display window as illustrated. The client computer 101 records information such as the identity of the showcase advertisement, the time of the display to the user, and the duration of the display, in the advertisement statistics file, each time a showcase message is displayed.

In an alternate embodiment, a regular or "generic" banner advertisement 800 could be shown concurrently with the showcase advertisements 1001. The generic banner advertisement may, for example, use a limited number of colors, allowing the system to maximize the use of the colors in the showcase advertisements 1001.

To the left of the showcase message 1001, a transfer status 1002 is displayed. This status alerts the user to the percentage of data that has transferred between the client computer 101 and the mail server Mn and what transfer operation is being performed (e.g., modem dialing, modem connecting, transferring, disconnecting, etc.).

Figure 11:
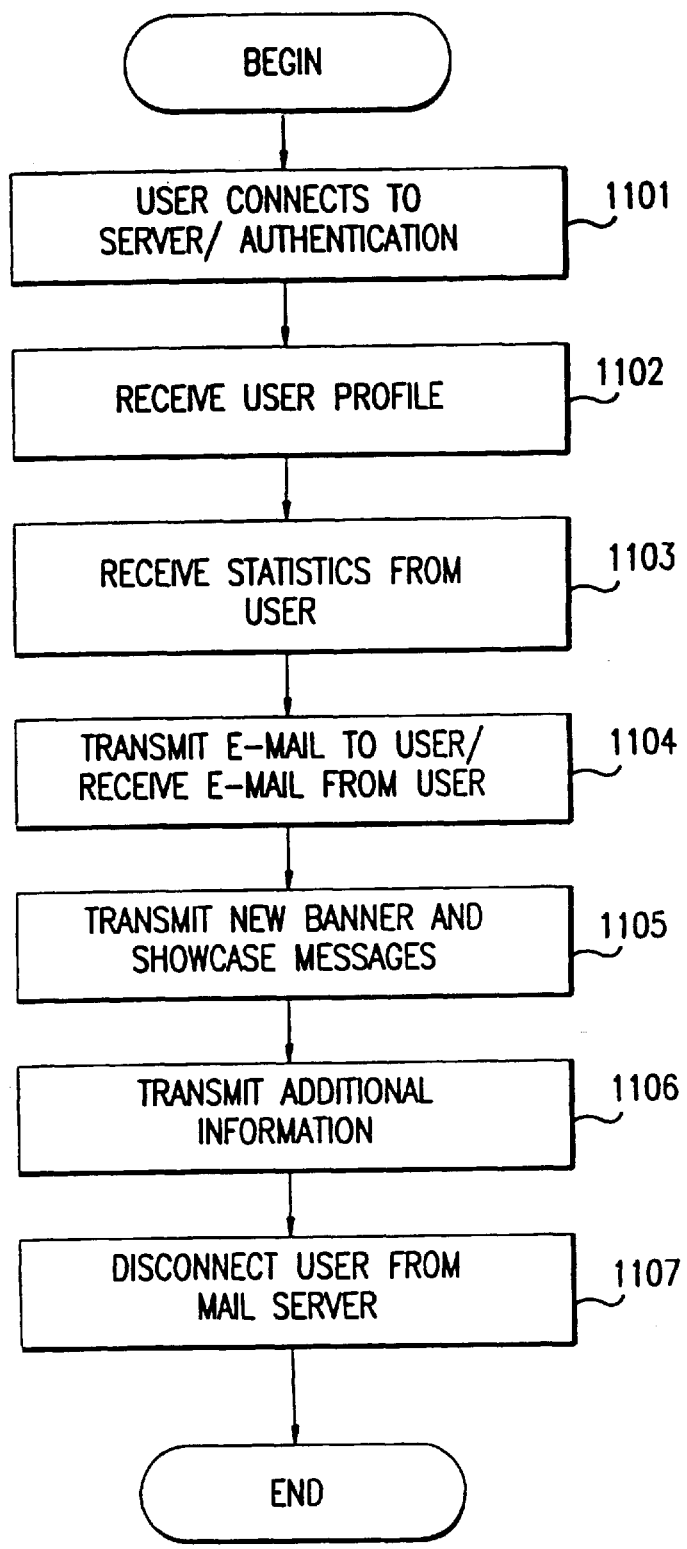
FIG. 11 is a flowchart of the communication process that takes place between the client computer and the server system as performed by the server system.

FIG. 11 illustrates the transfer process of FIG. 9 from the perspective of the server system 104. After the user connects to the appropriate mail server Mn and the user is authenticated (step 1101), and, if necessary, the mail server Mn receives from the client computer 101 the user profile (step 1102). The mail server Mn also receives statistical information from the client computer 101, such as, for example, the event log file and the advertisements statistics file (step 1103). In the representative embodiment, the user profile and the statistical information may be temporarily stored in the mail server Mn. Late at night (off-peak), a batch job may be run to incorporate all the new data into the database management system 106. This information can be used to determine which advertisements are eligible for downloading to a particular user, when the advertisements are to be downloaded, and when the advertisements are to be displayed. The event log file and the advertisement statistics file are also used to create billing information for advertisers. After these files are transmitted to the server system 104 by the client computer 101, a backend program at the server system 104 reads and processes these files for reporting and billing advertisers whose advertisements have been distributed and/or displayed.

The mail server Mn transmits e-mail messages addressed to the user to that user's client computer 101 and receives e-mail messages from the client computer 101 to be sent to others (step 1104). As indicated above, the e-mail messages addressed to each user are preferably stored at the mail server M0-Mn to which the user is assigned, in this case, mail server Mn. Thus, to retrieve e-mail messages for a particular user, mail server Mn need only access the files containing the e-mail messages addressed to that user and transmit them to the user. Thus, in the representative embodiment, the mail server Mn does not need to remotely access another machine, thus improving performance and availability by reducing network traffic.

New banner and showcase advertisements are transmitted from the mail server Mn to the user at the client computer 101. When the user connects to mail server Mn, mail server Mn transmits the appropriate advertisements to the user.

In an exemplary embodiment of the present invention, the database management system 106 determines which users are eligible to receive each particular advertisement, and that advertisement will be "placed" in each eligible user's directory on the mail server. When placing an advertisement in the directory, the present invention may place a copy the advertisement in the directory or create a symbolic link in the directory to a central or common location where the advertisement is stored. This process of determining which users are eligible to receive an advertisement and "placing" the advertisement in the user's directory may take place at an off-peak period such as very late at night.

Where there is more than one user of a particular client computer 101, the advertisements that are eligible to be transferred to all users of that client computer can be stored together on the mail server. Thus, whenever one of those users connects to the mail server, all or a portion of the advertisements for all users of that client computer 101 can be transferred to the client computer 101.

Additional information, such as software patches, new modem configuration data, and new POP data, may be transferred by the server system 104 to the client computer 101 (step 1107).

Once the mail server Mn has finished transmitting and receiving information, the client computer 101 is disconnected from the mail server Mn (step 1108).

Referring again to FIG. 8, the user can click on an "Address Book" button 810. Upon clicking on the "Address Book" button 810, the user is presented with his current list of e-mail addresses (of other system users and non-users) that the user has stored, e.g., on storage device 206. The user may add other e-mail addresses to this electronic "address book."

Figure 12:
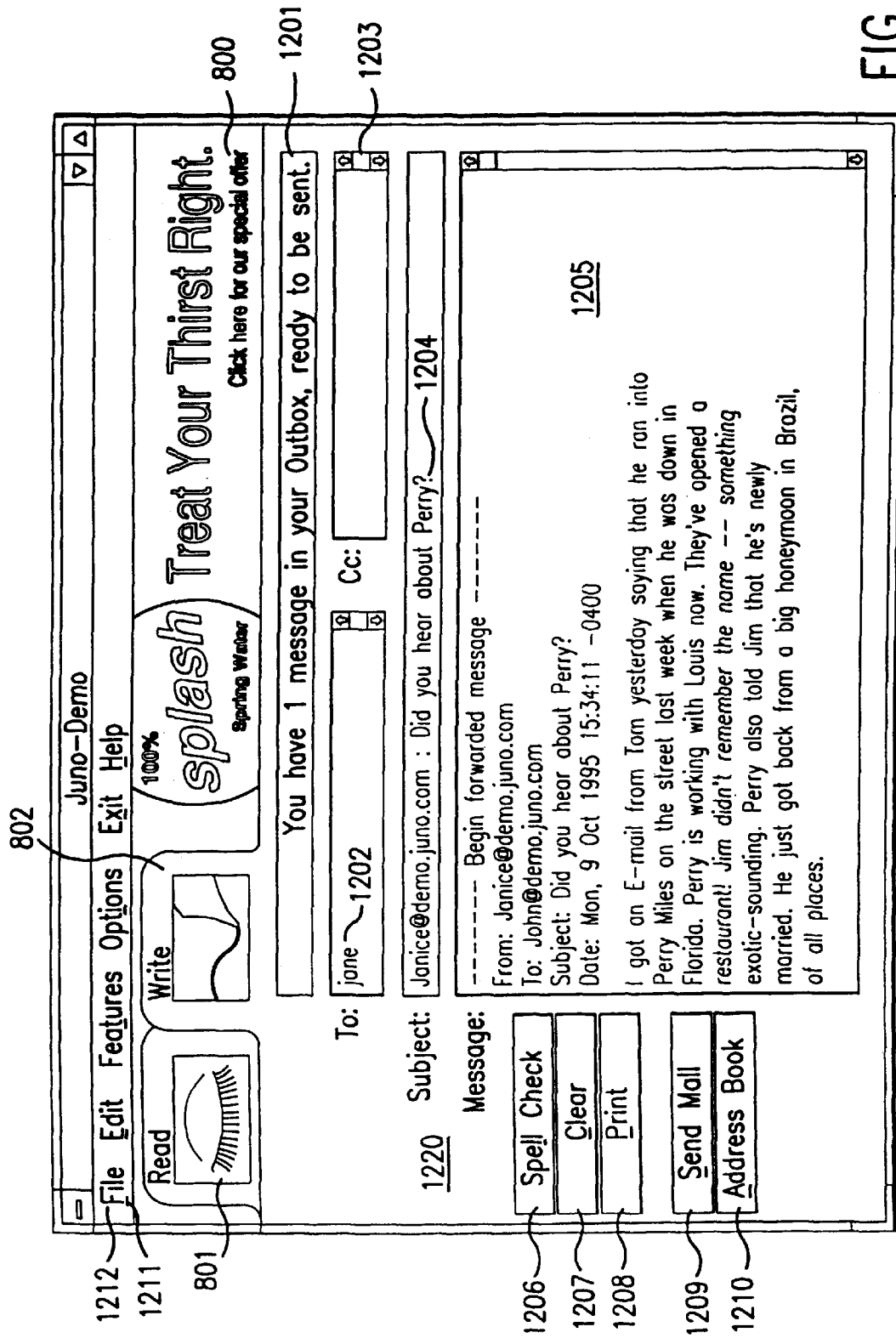
FIG. 12 illustrates an example write screen used to create e-mail messages.

If the user wishes to compose an e-mail message, the user can select the write tab 802 (step 505), causing the write screen 1220 to be displayed, as shown in FIG. 12 (step 506). The write screen 1220 presents the user with a blank e-mail message template 1201 which the user can complete, as well as several GUI buttons: a "Spell Check" button 1206, a "Clear" button 1207, a "Print" button 1208, a "Send Mail" button 1209, and an "Address Book" button 1210.

As illustrated, the e-mail message template 1201 includes a "To:" field which the user can enter e-mail addressees. In this case, only one e-mail addressee has been entered, "jane@demo.com," however, several different e-mail addressees could have been entered.

The e-mail template 1201 also includes a "Cc:" field 1203 for entering the e-mail addresses of users who should receive a copy of the e-mail the user is sending. Here, "janice@demo.com" is entered in the "Cc:" field 1203.

Additionally, a "Subject:" field 1204 is provided for entering information preferably identifying the subject of the e-mail message. "Perry" is the subject of the e-mail message illustrated.

Finally a "Message:" field 1205 is provided. This is the portion of the e-mail template 1201 where the user can write a message, i.e., fill in the message body.

Once the e-mail template 1201 has been completed, the user can click on the "Spell Check" button which provides checks the spelling of information in the "Message:" field 1205.

Clicking on the "Clear:" button 1207 provides the function of clearing the e-mail message template 1201 so that the user can rapidly clear the fields of the e-mail message template.

The "Print" button 1208, when selected, causes the client computer 101 to print the e-mail template 1201, with the information entered, to a printer that is coupled to the client computer 101.

If the user decides that the e-mail message is complete, the user may select the "Send Mail" button 1209. In response, the client computer 101 asks the user whether the user wants to move the message to an "outbox" folder or whether the user wants to send (and receive) e-mail messages immediately. A user will generally elect to move the message to an "outbox" folder if the user intends to write more e-mail messages during the current session. As described earlier, the "outbox" folder is preferably for temporary storage of outgoing e-mail messages that are waiting to be sent. If the user does elect to move the message to the "outbox" folder, the message is stored on the storage device 206 of the client computer 101, and the user is again presented with a blank e-mail template.

If instead, the user elects to send and receive e-mail immediately, the processes described in connection with FIGS. 9 and 11 are performed. E-mail messages stored in the user's "outbox" folder as well as the current new e-mail message are transmitted by the client computer 101 to the mail server Mn for delivery.

If the addressees of the e-mail transmitted are users of the present invention, the e-mail will be delivered to the addressees then next time they connect to a mail server M0-Mn. Otherwise, the mail server Mn will transmit the e-mail message outside the present system, for example, over the Internet 107.

Finally, clicking on the "Address Book" 1210 results in the display of the user's current list of e-mail addresses (of other system users and non-users) that he has stored on storage device 206. Using the electronic "address book," the user can look up the address of someone to whom the user wishes to send an e-mail message. The user may also add other e-mail addresses to the electronic address book.

When creating e-mail messages in the write screen 1220, banner advertisements 800 are displayed to the user. The client computer 101 is not connected to the server system 104 when the user is creating e-mail messages.

When the user has completed all e-mail processing, the user can exit the client program by selecting "File" 1211 positioned in a menu bar 1212 and then selecting "Exit" from a drop down menu (step 507).

More than one user may use a single client computer 101. In such case, a subdirectory is provided for each user on the client computer 101, e.g., user0, user1, etc. However, there need be only one "ads" directory storing advertisements. These advertisements may be eligible for display to all, some or one only of the users. In the representative embodiment, each advertisement contains scheduling information for each user to whom the advertisement will be shown. In addition, a list of known advertisements for each user is maintained on the client computer 101. This list is modified by an advertisement scheduler and advertisement spooler both of which run locally on the client computer 101. The advertisement scheduler removes an advertisement from a user's list when the advertisement expires. The advertisement spooler makes additions to the per-user data structures when a new advertisement is received.

Figure 6:
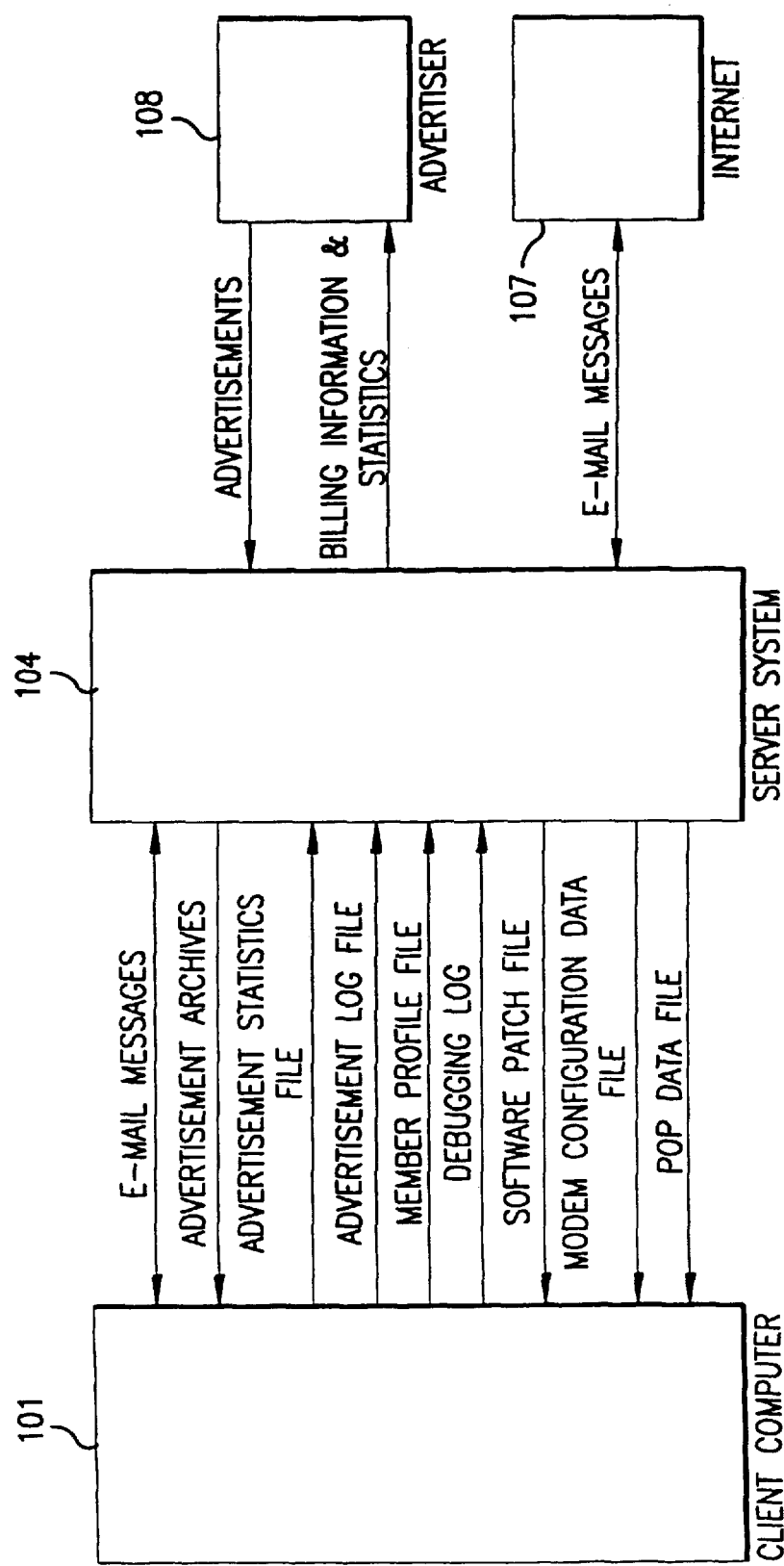
FIG. 6 illustrates information communicated between the client computer and the server system.

FIG. 6 summarizes the information that is communicated between the client computer 101 and the server system 104 of the representative embodiment of the present invention. E-mail messages are compressed for transmission. Advertisement archives are transferred from the server system 104 to the client computer 101. Each advertisement archive comprises a combination of advertisement data (as discussed above with reference to the PDL) and advertisement control information. Advertisement control information includes scheduling information for that advertisement, e.g., show the advertisement twenty times, by only for the next ten days. The advertisement archive is stored in compressed format at the server system 104. (For convenience only, this specification sometimes refers to transmission of an advertisement from the server system 104 to a client computer 101. In the representative embodiment, it is an advertisement archive, not actual an advertisement, that is transmitted.)

An advertisement statistics file and an event log file are compressed prior to transmission and sent from the client computer 101 to the server system 104. A member profile file, storing information about the user, is sent for the client computer 101 to the server system 104. In the representative embodiment, this file is in a Windows INI format, and is compressed for transmission. A file comprising a debugging log is also transmitted, in compressed form, from the client computer 101 to the server system 104.

The following files are sent from the server system 104 to the client computer 101: a binary data file comprising a software patch, compressed prior to transmission; a file comprising modem configuration and identification data used by modem configuration software at the client computer 101, compressed prior to transmission; and a file of POP data, including dial scripts and telephone numbers referring to points of presence, compressed prior to transmission.

FIG. 6 also illustrates the information that is communicated between the server system 104 and an advertiser or sponsor 108. In particular, files containing advertisement information may be communicated from the advertiser 108 to the server system 104 for processing and storage in database management system 106. Also, billing information and statistics may be communicated to the advertiser 108 from the server system 104. The advertisements, billing information, and statistics may be electronically communicated between the server system 104 and the advertiser 108, directly or indirectly, over a network, over the air waves, or over any other communication media. Alternatively, the information may simply be hand delivered on a storage media such as tape or disk.

Although FIG. 6 shows only one advertiser 108, it will be appreciated that the representative embodiment of the present invention can include many advertisers.

Also illustrated in FIG. 6 is the flow of information between the server system 104 and an external network such as the Internet 107. As described above, the server system may transmit information such as e-mail messages to and from non-users of the server system 104 via the external network 107.

As can be appreciated, the present invention operates in an efficient manner. In particular, the user at the client computer 101 operates locally while composing and reading e-mail messages. Only when the user is ready to transmit or receive new e-mail messages does the client computer 101 establish a communications link with the server system 104, and the client computer 101 is disconnected as soon as all information is transmitted and received. Thus, the system operates in a "batch" mode. This, of course, keeps the costs associated with maintaining a communications link, i.e., connect or line charges, low.

Further, the present invention maximizes potential advertising time by displaying messages to a user at a client computer 101 even when the client computer 101 is "off-line" from the server system 104.

It will be appreciated that the principles of the present invention could be used to provide advertisements to users in on-line systems other than e-mail systems. For example, the present invention could be adapted to output a series of advertisements to users in a system that allowed downloading of a number of web pages for off-line browsing. In general, the present invention could be utilized wherever digital content is downloaded to a user for off-line access.

While the present invention has been particularly shown and described with reference to preferred embodiments thereof, it will be understood by those skilled in the art that various changes in form and details may be made therein without departing from the spirit and scope of the invention.

What is claimed is:

1. In an electronic mail system, a method to output additional content to a user at a local computer when the local computer is off-line, comprising the steps of:

creating an electronic mail message at the local computer;

establishing a communications link between the local computer and a remote system;

receiving the additional content from the remote system;

storing the additional content on a storage device at the local computer;

transferring the electronic mail message from the local computer to the remote system;

terminating the communications link between the local computer and the remote system; and outputting the additional content at the local computer while the local computer is off-line with respect to the remote system.

2. The method of claim 1, wherein the additional content comprises at least one of (a) an advertisement, (b) a plurality of additional content portions representing a plurality of advertisements and (c) information other than an electronic mail message sent between a plurality of local computers through the remote system.

3. The method of claim 1 further comprising the steps of:

at the local computer, recording in a statistics file an indication that the additional content was output; and storing the statistics file on the storage device at the local computer.

4. The method of claim 3 further comprising the step of utilizing the statistics file to create a billing account related to the additional content.

5. The method of claim 1 wherein the local computer initiates the communications link with the remote system.

6. The method of claim 1 wherein the remote system is coupled to the Internet.

7. The method of claim 1 further comprising the initial steps of:

receiving, at the remote system, a member profile from the user, the member profile comprising demographic information about the user;

utilizing the member profile to determine the additional content that will be communicated to the user.

8. In an electronic mail system, a method to output additional content to a user at a local computer when the local computer is off-line, comprising the steps of:
- establishing a communications link between the local computer and a remote system;
- receiving additional content from the remote system;
- storing the additional content on a storage device at the local computer;
- transferring an electronic mail message from the remote system to the local computer;
- storing the electronic mail message on the storage device at the local computer;
- terminating the communications link between the local computer and the remote system;
- outputting the electronic mail message at the local computer;
- concurrently with the previous step, outputting a portion of the additional content at the local computer while the local computer is off-line with respect to the remote system.

9. The method of claim 8 further comprising the step of replacing the output additional content with a second portion of the additional content while the local computer is off-line with respect to the remote system.

10. The method of claim 9 further comprising the steps of:
- at the local computer, recording in a statistics file an indication of the additional content that has been output; and
- storing the statistics file on the storage device at the local computer.

11. The method of claim 10 further comprising the steps of:
- creating an electronic mail message at the local computer while the local computer is off-line with respect to the remote system;
- re-establishing the communications link between the local computer and the remote system; and
- transferring the statistics file and the second electronic mail message from the local computer to the remote system.

12. The method of claim 11 wherein a third portion of the additional content is output while the electronic mail message is created.

13. The method of claim 12 further comprising the step of utilizing the statistics file to create a billing account related to the additional content.

14. The method of claim 8 wherein the local computer initiates the communications link with the remote system.

15. The method of claim 8 further comprising the initial steps of:
- receiving, at the remote system, a member profile from the user, the member profile comprising demographic information about the user;
- utilizing the member profile to determine that additional content to be communicated to the user.

16. In an electronic mail system, a method to output additional content to a user at a local computer when the local computer is off-line, comprising the steps of:
- creating a first electronic mail message at the local computer;
- concurrently with the previous step, outputting a first portion of the additional content at the local computer while the user is creating the first electronic mail message;
- establishing a communications link between the local computer and a remote system;
- receiving a second portion of the additional content from the remote system;
- storing the second portion of the additional content on a storage device at the local computer;
- transferring the first electronic mail message from the local computer to the remote system;
- transferring a second electronic mail message from the remote system to the local computer;
- storing the second electronic mail message on the storage device at the local computer;
- terminating the communications link between the local computer and the remote system;
- outputting the second portion of the additional content at the local computer while the local computer is off-line with respect to the remote system; and
- concurrently with the previous step, displaying the second electronic mail message at the local computer while the local computer is off-line with respect to the remote system.

17. The method of claim 16 wherein the first portion of the additional content is stored on the storage device of the local computer.

18. The method of claim 16 further comprising the step of outputting the first portion of the additional content in place of the second portion of the additional content while the second electronic mail message is displayed and while the local computer is off-line with respect to the remote system.

19. The method of claim 16 further comprising the steps of:
- at the local computer, recording in a statistics file an indication that the additional content was output; and
- transferring the statistics file from the local computer to the remote system when the communications link is established between the local computer and the remote system.

20. The method of claim 19 further comprising the step of utilizing the statistics file at the remote system to create a billing account related to the additional content.

21. The method of claim 16 wherein the local computer initiates the communications link with the remote system.

22. The method of claim 16 further comprising the initial steps of:
- receiving, at the remote system, a member profile from the user, the member profile comprising demographic information about the user; and
- utilizing the member profile to determine that additional content to be communicated to the user.

23. A method to operate an e-mail system having a server system and a plurality of user computers, comprising the steps of:
- enabling the creation and reading of e-mail messages at user computers while the user computers are off-line with respect to the server system;
- transferring e-mail messages between the user computers and the server system while the user computers are on-line with respect to the server system;
- transferring additional content from the server system to the user computers while the user computers are on-line with respect to the server system;
- storing the transferred additional content locally at the user computers; and
- outputting the stored additional content at the user computers when e-mail messages are being created or read and while the user computers are off-line with respect to the server system.

24. A method of operating an e-mail system having a plurality of user computers operated by users and a server system, comprising the steps of:

enabling the creation and reading of e-mail messages at user computers while the user computers are off-line with respect to the server system;

determining, at the server system, additional content that is relevant for each user;

transferring e-mail messages between the user computers and the server system while the user computers are on-line with respect to the server system;

transferring relevant additional content from the server system to the user computers while the user computers are on-line with respect to the server system;

storing the transferred additional content locally at the user computers;

outputting the stored additional content at the user computers when e-mail messages are being created or read while the user computers are off-line with respect to the server system.

25. In an electronic mail system, a method to output additional content to a user at a local computer when the local computer is off-line, comprising the steps of:

coupling the local computer to a remote system;

receiving a first portion of the additional content and a second portion of the additional content from the remote system;

storing the first portion of the additional content and the second portion of the additional content on a storage device at the local computer;

transferring an electronic mail message from the remote system to the local computer;

storing the electronic mail message on the storage device at the local computer;

decoupling the local computer from the remote system;

displaying the electronic mail message at the local computer; and concurrently with the previous step, (a) displaying the first portion of the additional content at the local computer while the electronic mail message is displayed, and (b) after a predetermined time, displaying the portion of the additional output in place of the first portion of the additional content while the electronic mail message is displayed.

26. In an electronic mail system, a method to output additional content to a user at a local computer when the local computer is off-line, comprising the steps of:

creating a first electronic mail message at the local computer;

concurrently with the previous step, displaying a first portion of the additional content at the local computer while the user is creating the first electronic mail message;

storing, in a statistics file, information to identify that the first portion of the additional content was displayed;

coupling the local computer to a remote system;

receiving a second portion of the additional content from the remote system;

storing the second portion of the additional content on a storage device at the local computer;

transferring the first electronic mail message from the local computer to the remote system;

transferring the statistics file from the local computer to the remote system;

transferring a second electronic mail message from the remote system to the local computer;

storing the second electronic mail message on the storage device at the local computer;

decoupling the local computer from the remote system;

displaying the second portion of the additional content at the local computer while the local computer is communicatively disconnected from the remote system; and concurrently with the previous step, displaying the second electronic mail message at the local computer while the local computer is off-line with respect to the remote system.

27. A method to operate a network having a server system and a plurality of user computers, comprising the steps of:

enabling the output of digital content to users at user computers while the user computers are off-line with respect to the server system;

transferring digital content from the server system to the user computers while the user computers are on-line with respect to the server system;

transferring additional content from the server system to the user computers while the user computers are on-line with respect to the server system;

storing the transferred additional content locally at the user computers; and outputting the stored additional content at the user computers when the digital content is output to users at user computers while the user computers are off-line with respect to the server system.

28. An electronic mail system to output additional content to a user, comprising:

a remote system comprising a plurality of mail servers storing additional content and electronic mail messages; and a local computer having a storage device and a processor program for creating an electronic mail message, establishing a communications link with the remote system, receiving the additional content from the remote system, storing the additional content on the storage device, transferring the electronic mail message to the remote system, terminating the communications link with the remote system, and outputting the additional content while off-line with respect to the remote system.

29. The system of claim 28 wherein the local computer further comprises:

means for recording in a statistics file an indication that the additional content was output; and means for storing the statistics file on the storage device.

30. The system of claim 29 wherein the local computer further comprises:

means for creating a member profile comprising demographic information about the user; and means for transmitting the member profile to the remote system.

31. An e-mail terminal for use in conjunction with a server system having one or more mail servers, comprising:

means for creating an electronic communications link with the server system;

means for transferring additional content from the server system while in electronic communications with the server system;

a storage device for storing additional content received from the server system;

means for terminating the electronic communications link with the server system;

means for enabling the creation and reading of e-mail messages while not in electronic communications with the server system;

means for transferring e-mail messages from at least one of the mail servers of the server system while in electronic communications with the server system; and an output device for outputting the stored additional content when e-mail messages are being created or read.

32. An e-mail system for use by a plurality of users, comprising:

a server system, including means for determining additional content that is relevant for each user;

means enabling the creation and reading of e-mail messages at remote computers while said remote computers are off-line with respect to the server system;

means for transferring e-mail messages between said remote computers and the server system while said remote computers are on-line with respect to the server system;

means for transferring relevant additional content from the server system to remote computers while said remote computers are on-line with respect to the server system;

means for storing the transferred additional content locally at the remote computers;

means for outputting the stored additional content at the remote computers when e-mail messages are being created or read at the remote computers.

33. A method to operate an e-mail system having a server system and a plurality of user computers, comprising the steps of:

enabling the creation and reading of e-mail messages by users at user computers while the user computers are off-line with respect to the server system;

transferring e-mail messages between the user computers and the server system while the user computers are on-line with respect to the server system;

transferring additional content from the server system to the user computers while the user computers are on-line with respect to the server system;

storing the transferred additional content locally at the user computers; and outputting, under the control of the user computers and without user intervention, the stored additional content at the user computers when the user computers are off-line with respect to the server system.

34. The method of claim 33 further comprising the step of allowing the user to select additional content while the additional content is being output, and thereafter outputting additional information to the user, the additional information stored locally at the user computer along with the additional content that was selected.

* * * * *